(12) United States Patent
House et al.

(10) Patent No.: US 10,761,127 B2
(45) Date of Patent: Sep. 1, 2020

(54) ELECTRONIC COMPONENT CLASSIFICATION

(71) Applicant: Battelle Memorial Institute, Columbus, OH (US)

(72) Inventors: Larry J. House, Columbus, OH (US); Dale C. Engelhart, Hillard, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 16/533,978

(22) Filed: Aug. 7, 2019

(65) Prior Publication Data

US 2020/0003818 A1  Jan. 2, 2020

Related U.S. Application Data

(60) Continuation of application No. 16/057,997, filed on Aug. 8, 2018, now Pat. No. 10,416,219, which is a continuation of application No. 15/696,667, filed on Sep. 6, 2017, now Pat. No. 10,054,624, which is a division of application No. 15/178,708, filed on Jun.

(Continued)

(51) Int. Cl.
| | |
|---|---|
| *G01R 29/26* | (2006.01) |
| *G06F 21/44* | (2013.01) |
| *G06K 9/00* | (2006.01) |
| *G06K 9/62* | (2006.01) |

(52) U.S. Cl.
CPC ............. *G01R 29/26* (2013.01); *G06F 21/44* (2013.01); *G06K 9/00536* (2013.01); *G06K 9/00577* (2013.01); *G06K 9/6276* (2013.01)

(58) Field of Classification Search
CPC ............... G01R 29/26; G06K 9/00536; G06K 9/00577; G06K 9/6276; G06F 21/44
See application file for complete search history.

(56) References Cited

U.S. PATENT DOCUMENTS

| | | |
|---|---|---|
| 5,218,294 A | 6/1993 | Soiferman |
| 5,428,683 A | 6/1995 | Indeck et al. |

(Continued)

FOREIGN PATENT DOCUMENTS

| | | |
|---|---|---|
| EP | 1 099 197 | 5/2001 |
| JP | S57-13376 | 1/1982 |

(Continued)

OTHER PUBLICATIONS

Huang, K. et al., "Counterfeit Electronics: A Rising Threat in the Semiconductor Manufacturing Industry", EEE International Test Conference (ITC), Sep. 6-13, 2013, pp. 1-4.

(Continued)

*Primary Examiner* — Toan M Le
(74) *Attorney, Agent, or Firm* — Warner Norcross + Judd LLP

(57) ABSTRACT

A system and method of electronic component authentication or component classification can reduce the vulnerability of systems (e.g., satellites, weapons, critical infrastructure, aerospace, automotive, medical systems) to counterfeits. Intrinsic deterministically random property data can be obtained from a set of authentic electronic components, processed, and clustered to create a classifier that can distinguish whether an unknown electronic component is authentic or counterfeit.

20 Claims, 26 Drawing Sheets

Related U.S. Application Data 10, 2016, now Pat. No. 9,759,757, which is a continuation of application No. PCT/US2014/069882, filed on Dec. 12, 2014.

(60) Provisional application No. 61/915,836, filed on Dec. 13, 2013.

(56) References Cited

U.S. PATENT DOCUMENTS

| | | |
|---|---|---|
| 5,546,462 A | 8/1996 | Indeck et al. |
| 5,625,689 A | 4/1997 | Indeck et al. |
| 5,740,244 A | 4/1998 | Indeck et al. |
| 6,161,213 A | 12/2000 | Lofstrom |
| 7,017,048 B2 | 3/2006 | Schneider et al. |
| 7,210,634 B2 | 5/2007 | Sapiro |
| 7,757,083 B2 | 7/2010 | Devadas et al. |
| 7,827,413 B2 | 11/2010 | Liardet et al. |
| 7,840,803 B2 | 11/2010 | Clarke et al. |
| 7,904,731 B2 | 3/2011 | Devadas et al. |
| 8,069,490 B2 | 11/2011 | Gross et al. |
| 8,139,846 B2 | 3/2012 | Bajura et al. |
| 8,274,306 B1 | 9/2012 | Garcia |
| 8,341,759 B2 | 12/2012 | Gross et al. |
| 8,384,415 B2 | 2/2013 | Lewis |
| 8,386,801 B2 | 2/2013 | Devadas et al. |
| 8,476,920 B2 | 7/2013 | Brown et al. |
| 8,516,269 B1 | 8/2013 | Hamlet et al. |
| 8,610,454 B2 | 12/2013 | Plusquellic et al. |
| 8,667,265 B1 | 3/2014 | Hamlet et al. |
| 8,782,396 B2 | 7/2014 | Ziola et al. |
| 8,825,823 B2 | 9/2014 | Keller, III |
| 8,848,905 B1 | 9/2014 | Hamlet et al. |
| 8,868,923 B1 | 10/2014 | Hamlet et al. |
| 8,874,926 B1 | 10/2014 | Edwards et al. |
| 8,950,008 B2 | 2/2015 | Fainstein et al. |
| 9,018,972 B1 | 4/2015 | Gurrieri et al. |
| 9,059,189 B2 | 6/2015 | Keller, III et al. |
| 9,071,446 B2 | 6/2015 | Kreft |
| 9,121,873 B2 | 9/2015 | Satoh et al. |
| 9,129,671 B2 | 9/2015 | Salters et al. |
| 9,188,622 B1 | 11/2015 | Tangyunyong et al. |
| 9,208,355 B1 | 12/2015 | Areno |
| 9,262,632 B2 | 2/2016 | Reed et al. |
| 9,268,938 B1 | 2/2016 | Aguayo Gonzalez et al. |
| 9,759,757 B2 | 9/2017 | House et al. |
| 10,054,624 B2 | 8/2018 | House et al. |
| 10,416,219 B2 * | 9/2019 | House .................. G06K 9/6276 |
| 2003/0052395 A1 | 3/2003 | Nakamura et al. |
| 2007/0027643 A1 | 2/2007 | Lesesky et al. |
| 2007/0234058 A1 | 10/2007 | White |
| 2009/0099830 A1 | 4/2009 | Gross et al. |
| 2010/0241864 A1 | 9/2010 | Kelley et al. |
| 2012/0223403 A1 | 9/2012 | Keller, III et al. |
| 2012/0226463 A1 | 9/2012 | Keller, III et al. |
| 2013/0108145 A1 | 5/2013 | Cobb et al. |
| 2013/0127442 A1 | 5/2013 | Satoh et al. |
| 2014/0258156 A1 | 9/2014 | Tziazas et al. |
| 2015/0046715 A1 | 2/2015 | Ignatchenko |
| 2015/0052364 A1 | 2/2015 | Edwards et al. |
| 2015/0219714 A1 | 8/2015 | Hamilton et al. |
| 2015/0317475 A1 | 11/2015 | Aguayo Gonzalez et al. |
| 2016/0112083 A1 | 4/2016 | Keller, III et al. |
| 2016/0117502 A1 | 4/2016 | Reed et al. |
| 2016/0117503 A1 | 4/2016 | Reed et al. |
| 2018/0348278 A1 | 12/2018 | House et al. |

FOREIGN PATENT DOCUMENTS

| | | |
|---|---|---|
| WO | 2005/077024 | 8/2005 |
| WO | 2007/028799 | 3/2007 |
| WO | 2012/061663 | 5/2012 |
| WO | 2013/131073 | 9/2013 |
| WO | 2016/042144 | 3/2016 |

OTHER PUBLICATIONS

Lehtonen, M. et al., "Anti-counterfeiting Business Case Report", published in Bridge, Dec. 2007, pp. 1-79.

"Principal Component Analysis 4 Dummies: Eigenvectors, Eigenvalues and Dimension Reduction", published at georgemdallas.wordpress.com and available for download at least as of Oct. 30, 2013, pp. 1-8.

Shade, G., "Response to Counterfeit ICs in the Supply Chain", published as part of the IEEE Reliability Society 2008 Annual Technology Report, pp. 1-6.

ABI Electronics Sentry Counterfeit IC Detector data sheet, http://www.abielectronics.com/Products/SENTRYCounterfeitICDectector.php, downloaded on Jan. 18, 2014, pp. 1-9.

Neumann, P. et al., "The V-I Characteristic Comparison Method in Electronic Component Diagnostics", DAAAM World Symposium, Nov. 2011, pp. 0057-0058.

Neumann, P. et al., "How Can V-I Characteristics Help in Counterfeit Component Detection", XX IMEKO World Congress, Sep. 2012, p. 1.

International Search Report and the Written Opinion of the International Searching Authority for International Application No. PCT/2014/069882 dated Apr. 2, 2015.

* cited by examiner

Fig. 12A
Non-distinguishing parameterization

Fig. 12B
Unique individual parameterization

Tagging, serialization and tracking: measure and record unique PUF fingerprint of each and every part from a trusted source Fig. 12C
Poor class parameterization Fig. 12D
Unique class parameterization Measure PUF fingerprint of a few authentic parts from each class and enroll in classifier

SPY GRAPH REPRESENTATION OF CLASSIFIER

SUB-CLUSTERING BEFORE PCA

ELECTRONIC COMPONENT CLASSIFICATION

BACKGROUND OF THE INVENTION

The present invention relates to classification or authentication of electronic components.

Electronic components are widely counterfeited. It is estimated that between 5% and 25% of all electronic components include at least one counterfeit component. Some have estimated that counterfeit electronic components cost the industry as much as one-hundred billion dollars every year.

A counterfeit electrical component generally refers to a component that imitates a genuine electrical component. Counterfeit components can include components created from substandard or cheaper components. For example, counterfeit components may substitute an integrated circuit harvested from an electronic trash dump or utilize a die from a substandard new part in an authentic looking package. Counterfeit components can also include older model components or used components that are packaged to imitate a newer model or new component.

Some different categories of counterfeits are described in Table 1.

TABLE 1

| Counterfeit Electronic Component Categories | |
| --- | --- |
| Type of Counterfeit Electronic Component | Description |
| Trivial Packaging Mimicry | These are empty plastic packages with topmarks appearing to be authentic, or remarked parts that share only external visual traits with the authentic part and are trivial to detect. One problem is when a small number of counterfeits are present in each reel or tube so that testing a sampling makes it unlikely the counterfeits are detected. |
| Salvaged and Refurbished | These are authentic parts that may even have the original markings but have been recovered from electronic waste dumps where they may have been subjected to excessive heat or exposed to harsh chemicals. These components are de-soldered from discarded PC boards and reprocessed to appear new. The chip may in fact authentic, but have degraded performance due to environmental exposure and having been used well into or past their service life. Non-functional parts may also be recovered from salvaged electronics waste. |
| Re-binned and Remarked | This type of counterfeit device may contain the wrong die internally and a remarked or newly manufactured package. In other cases these are parts that were authentic, and perhaps have never been used (so can be classified as "new"), but have their markings changed to reflect a higher specification of an identical function. |
| Factory Rejects and Scrap | Factory rejects and pilot runs can be recovered from the scrap heap for a small bribe, and given authentic markings and resold as new. In order to avoid detection, workers often replace the salvaged scrap with physically identical surrogate packages, thus foiling attempts to audit the scrap trail. Manufacturing rejects are often nearly functional, and with the true manufacturer marking they have the appearance of authentic components. |
| Illegitimate Second-Sourcing | Second-sourcing is a standard industry practice to create pin-compatible replacements for popular products in order to encourage price competition and increase sourcing options. The practice become illegitimate when inferior parts are remarked with the logos of premium brands. |

TABLE 1-continued

| Counterfeit Electronic Component Categories | |
| --- | --- |
| Type of Counterfeit Electronic Component | Description |
| Ghost-Shift Parts | These parts are manufactured from new but illegally acquired die and may come from the legitimate manufacturers rejects. The parts are created on the exact same fabrication facility as authentic parts, but run by employees without authorization of the manufacturer and never logged on the books. These parts may be assigned a lot code identical to a legitimate manufacturing run, but will not have undergone the entire testing process. |

Conventional electronic component authentication and authentication methods are either ineffective or impractical because of their time to complete or cost to execute. Among the emerging electronic component authentication and authentication technologies there are essentially three broad categories of electronic component authentication methods: 1) authentication based on difficult-to-reproduce physical features, 2) verification of products with unique identifiers, and 3) direct authentication.

Modifying a component to include a difficult-to-reproduce physical feature (e.g., holograms on credit cards) can impede counterfeit component construction. However, difficult-to-reproduce physical features historically have eventually become "easy-to-reproduce" when the financial incentives have justified the effort.

Unique identifiers can be used to serialize and track electronic components using a database for verification. However, mimicking a unique identifier of a known genuine component is not a significant impediment to counterfeit construction. Further, serializing and tracking unique identifiers can become ineffective if the supply chain is flooded with multiple counterfeits that carry the so-called unique identifiers.

Direct authentication relies on intrinsic deterministically random properties of the component, instead of an artificial feature added to the product. Mimicking an intrinsic deterministically random but random property of a component is much more difficult than mimicking an artificial feature that is added to the product for authentication. Although direct authentication can be more difficult to circumvent for this reason, it has its own set of issues (for example, if the intrinsic property is not truly random and can be cloned then it will provide little protection from counterfeiters).

Some direct authentication techniques are destructive. That is, the act of determining the intrinsic deterministically random properties of the component, in some cases, destroys the component. This can still be useful in some situations where it may be possible to destructively authenticate a subset of components from a group in order to authenticate the group as a whole. However, depending on the context, authenticating a statistically appropriate sample size may not be possible or may be cost prohibitive. For example, it may be impractical to destructively authenticate a statistically appropriate sample size of a group of components for use in a national security or public safety context.

Some emerging direct authentication methods of electronic component authentication are not destructive, but instead use intrinsic deterministically random or physically unclonable characteristics to create a "fingerprint" or tag for each component that is recorded, serialized, and tracked through a database. This method can be effective provided that sources and supply chain logistics for the components are trusted and the database is immune from attacks and corruption. Depending on the specific "fingerprint" employed (e.g., package properties) this type of direct authentication may not detect components that contain hardware Trojans or have been weaponized in some other fashion.

SUMMARY OF THE INVENTION

The present invention is directed to classification of electronic components from an untrusted source using direct authentication. Classification may include classifying a component as authentic or counterfeit. Classification may also include classifying a component as a specific component class or an unknown component class. An electronic component from an untrusted source can be classified based on the similarity or differences of one or more of its intrinsic deterministically random properties relative to one or more intrinsic random properties of one or more authentic electronic components. This classification can be done non-destructively, quickly, and at a low cost.

In one embodiment, a classifier can be created to classify an electronic component from an untrusted source. The classifier can be created by obtaining measurements from a number of trusted components, where the measurements include signals indicative of an intrinsic deterministically random property of each component, i.e., a time domain power consumption signal, a time domain electric field signal, a time domain magnetic field signal, a spatial domain electric field signal, or a spatial domain magnetic field signal. In one embodiment, the signals measured are indicative of the unique electrical noise signature of each component.

By building the classifier based on an intrinsic deterministically random property of a training set of trusted components the classifier can identify whether an intrinsic deterministically random property of an untrusted component is similar to the intrinsic deterministically random property of one (or a group) of the trusted components from the training set, and if so, which one(s). For example, the classifier can determine whether the intrinsic deterministically random noise signature of an unknown component is similar to the intrinsic deterministically random noise signature of one of the trusted components in the training set used to create the classifier.

Measurements used to build a classifier may be obtained from a training set of trusted components and the classifier may be built to classify unknown components according to a variety of criteria. Multiple measurements may be obtained from a trusted component in the training set. The training set of trusted components may include components from multiple component classes and may include multiple components from each component class. A component class may differentiate between components manufactured at a particular point in time, with a specific set of manufacturing equipment, or otherwise manufactured under a specific set of conditions. That is, in some embodiments, components that share functionality may not necessary share the same component class. A component class may differentiate between different generations of components, wherein some or all of the components of a component have been changed, but the same or similar functionality is provided. A component class may differentiate between one, or a group of trusted components in the training set that performs a substantially different function from a different one or different group of trusted components in the training set.

One embodiment of a method of component classification includes measuring or sensing signals indicative of deterministic noise signatures that are intrinsically unique to each member of a set of training components, segmenting those signals to create vector representations of the noise signatures, processing the vectors (i.e., by mathematical transformations to specific feature domains (e.g., FFT) and dimension reduction), and clustering the processed vectors to develop a vector set that represents similar attributes within a specified set representing a class of electronic components and yet unique relative to other sets that are members of different classes of electronic components. The uniqueness of the attributes for each class of components can be used in discriminating counterfeit and authentic parts and can be used to classify or authenticate unknown components from untrusted sources.

The signals of the trusted components can be processed and clustered to create the classifier. A similarly processed signal from an unknown electronic component can be input in the classifier and the classifier can output a classification of the unknown electronic component. Depending on how the classifier is created, the classifier may classify the unknown component as authentic, a specific class, counterfeit, or an unrecognized class. The classifier may provide a confidence value associated with its classification.

The trusted components for creating the classifier can be obtained from a trusted source or, if obtained from an untrusted source, their trustworthiness can be established utilizing known electronic component authentication electronic component authentication techniques. For example, after measuring a signal indicative of an intrinsic deterministically random property, the component may undergo destructive direct authentication to establish the authenticity of the component. Through use of intrinsic deterministically random noise signature and signal processing, destructive authentication of one or a few untrusted components can be used to create a classifier that classifies with significant confidence for untrusted components of that class.

A signal indicative of an intrinsic deterministically random property can be processed in a variety of different ways. In one embodiment, the signal is segmented into a vector and transformed into a feature vector in the frequency or a different time-independent domain. For example, the transformation can be a discrete Fourier transform, discrete cosine transform, Hilbert transform, real cepstrum, or a hybrid of several different transforms. The specific transformations can be selected based on achieving the desired clustering behavior.

The feature vector may be reduced in dimension by principal component analysis or some other dimension reduction technique. Reduction of dimensionality can include ordering the feature vectors from greatest variance between feature vectors to lowest variance between vectors. Low variance vectors below a threshold may be discarded to reduce dimensional space.

A clustering algorithm can be applied on a set of training data, i.e., a set of feature vectors, to produce a classifier. A transform matrix maps a sample from an unknown component, i.e., a feature vector of an unknown component, into the same space as the training data and the classifier can determine the most likely class of the unknown sample.

Processed signals of the trusted components can be clustered in a variety of different ways to create a viable classifier. For example, the clustering analysis can be a shared nearest neighbor analysis, k-means analysis, modified shared nearest neighbor analysis, or another type of clustering analysis. The clustering analysis may include defining a set of points with tolerances around that point in order to define specific classification areas. In one embodiment, processed signals may be sub-clustered before principal component analysis so that the principal component analysis focuses on the variation between classes, instead of the variation inside of each class.

One embodiment of an electronic component authentication system includes a control system, a component interface, storage, and a sensor. The component interface can include a socket for interfacing with the electronic component. The interface may include providing power and other signals to the electronic component. In one embodiment, the component interface includes connections for rail voltage, ground, and an external clock. The sensor may be a power consumption sensor, electric field, or magnetic sensor. The sensor may be integrated with the control system or circuit interface, or a separate component that communicates with the circuit interface or control system. The storage can store a codebook or classifier for use in classifying an unknown electronic component. The control system may be configured to build a classifier or codebook and to use the classifier or codebook. Building the classifier may include programming the control system to receive measurements indicative of an intrinsic deterministically random property from trusted components, process those measurements, and build a classifier or codebook based on those measurements. Using the classifier may include programming the control system to receive measurements indicative of an intrinsic deterministically random property from an unknown component from an untrusted source, process those measurements, and classify the component using the classifier or codebook stored in memory.

One embodiment of an electronic component authentication process includes receiving a plurality of components that each purports to be a component class, and determining whether each component class has been enrolled in an electronic catalog. For each unenrolled component class, conducting a pre-enrollment process to capture intrinsic deterministically random property data about one or more of the components in that component class and determining whether the components are authentic using destructive authentication. For authentic components, conducting enrollment process whereby the intrinsic deterministically random property data is stored in the electronic catalog database so that future components in that component class can be authenticated using the electronic catalog. For counterfeit components, documenting and quarantining the components and selecting one or more additional components from that component class to undergo capture of intrinsic deterministically random property data and authentication. For each component in an enrolled component class, determining whether the component is authentic by measuring a signal indicative of an inherent property of the component, such as an intrinsic deterministically random noise signal, and determining whether the component is authentic by comparison to the inherent property data in the electronic catalog for that component class. For authentic components, identifying the component as authenticated inventory or placing the component in authenticated inventory. For counterfeit components, documenting and quarantining the component.

The electronic component authentication method and system can enable 100% examination of electronic components without modifying the packaging (e.g., inserting or attaching tags or taggants), altering the design (e.g., die level edits or functionalizations, such as using physically unclonable functions to generate identifying signatures), or inserting new technology into the manufacturing process. The electronic component authentication method and system can address electronics reliability where there are no trusted foundries to produce parts, or parts are acquired from international chip brokers and secondary markets.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 12A-D illustrate four exemplary spy graphs.

DESCRIPTION OF THE CURRENT EMBODIMENT

Figure 1:
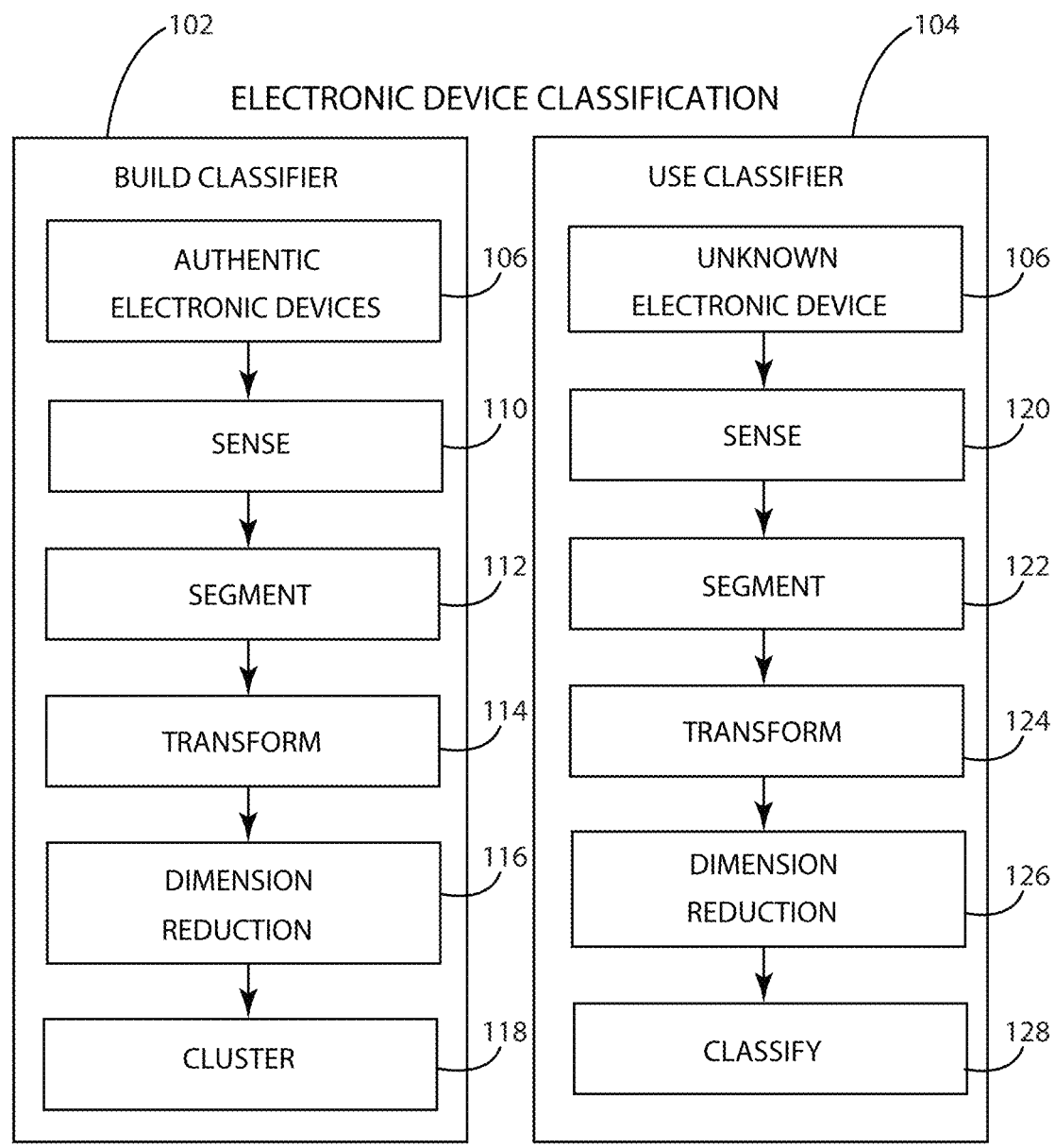
FIG. 1 illustrates a block diagram of one embodiment of a method of electronic component classification.

The present invention is directed to classification of electronic components from an untrusted source. Classification may include classifying a component as authentic or counterfeit. Classification may also include classifying a component as a specific component class or an unknown class. An electronic component from an untrusted source can be classified based on the similarity or differences of its intrinsic deterministically random properties relative to the intrinsic deterministically random properties of authentic electronic components. This classification can be done non-destructively, quickly, and at a low cost.

Intrinsically random properties of components exist that are unique to each individual component. Anti-counterfeiting methods based on using these properties to tag, serialize, and track components are emerging for assuring the integrity of the supply chain from trusted sources. However, these methods do not account for components acquired from untrusted sources. There is a prevalence of counterfeit components substituted for authentic components from an untrusted foundry or not directly acquired from a trusted foundry.

An intrinsic deterministically random noise signal exists in all digital, analog, and passive components. These signals can be parameterized to form identity vectors for designated classes of electronic components due to signal similarities within a given class. Parameterization of signal feature sets can be optimized to create multi-dimensional identity vectors that cluster in a way to statistically minimize false positive and false negative rates for identification of authentic and unaltered analog. Different clustering algorithms can be selected based on properties of said unknown electronic components. For example, certain clustering algorithms provide better clustering behavior for a given set of features based on properties of the unknown electronic component vectors category. That is, different clustering algorithms may be appropriate for passive, active, digital, analog, resistor, capacitor, etc. components. The clustering algorithm can be chosen based on the dynamic time domain characteristics of the acquired signal such as: modulation, impulse behavior, and types of unwanted noise.

The electronic component authentication method can include determining n-dimensional identity vectors that share sufficient similarities for all chips or components within each class of authentic components to cluster with low Type I and Type II errors. This allows a low cost, rapid, nondestructive authentication and validation of chips from non-trusted sources. It also can enable 100% examination of chips without modifying the chip packaging (e.g., inserting or attaching tags or taggants), altering the chip design (e.g., die level edits or functionalizations such as using physically unclonable functions to generate identifying signatures), or inserting new technology into the manufacturing process. The electronic component authentication method can address the issue of electronics reliability where there are no trusted foundries to produce the parts and instead parts must be acquired from international chip brokers and secondary markets where there may be vulnerabilities in the supply chain.

One advantage of some embodiments of the electronic component authentication method is that chips from trusted sources are not required. Only a very small number of components (e.g., as small as a single component that is initially trusted) can be used to create a classifier that can authenticate components already in the supply chain that have not been tagged and are not necessarily from trusted sources.

Electronic components have intrinsic data properties, such as unique electrical noise signatures that provide a fingerprint of the specific component. This is because the noise is the result of fabrication process differences between the same components in the same component lot. By measuring deterministic noise signatures that are intrinsically unique to each integrated circuit, creating an n-dimensional vector representation of the noise signatures; and applying a clustering algorithm to construct the vector set that represents the unique attributes counterfeit and authentic parts can be discriminated. The processed vectors can be used to create a codebook from which authentic components are recognized from a quick and simple noise measurement.

The die in integrated circuits have unique noise signatures which can be used to discriminate between authentic and counterfeit parts based on statistical clustering of n-dimensional feature vectors associated with each IC part number, manufacturing lot, and die layout. The noise measurement component can isolate the IC under test from extrinsic noise sources and measure the IC noise signature. A training set is composed of a number of trusted integrated circuits of the same part number. A training set is used to collect intrinsic waveforms that are segmented and parameterized to create an n-dimensional vector representation of the authentic integrated circuits for a given part number. A codebook can be created from the n-dimensional vectors representations of each integrated circuit for all the part numbers to be tested to determine authenticity. Chips can degrade over time and change their noise characteristics, so it may be possible to identify counterfeit chips that are manufactured with the same material, but at different points in time.

Referring to FIG. 1, one embodiment of an electronic component authentication method is illustrated. The method generally includes building a classifier 102 using authentic electronic components 106, and classifying 104 unknown electronic components 106. The authentic electronic components can originate from a trusted source, in which case the components may be assumed authenticated. Further, electronic components from an untrusted source may be authenticated and used to build the classifier. For example, a subset of components from a large shipment of components from an untrusted source may be authenticated and used as the basis for a classifier. For example, intrinsic noise signals may be measured and known destructive electronic component authentication analysis may be performed to verify the authenticity of the subset of components. The measurements from any counterfeit components are not used to build the classifier.

One embodiment of building a classifier generally includes sensing 110, segmenting 112, transforming 114, reducing dimension 116, and clustering 118. In general, the system senses a signal such as a power, current, or EM field for a plurality of components. In some embodiments, multiple signals for each component are sensed. Each of the signals is segmented to create a feature vector. These feature vectors can be transformed and reduced in dimension. The feature vectors can be clustered to create a classifier.

The sensing step 110 can include measuring any signal that is indicative of the intrinsically random properties of a component. For example, the following can be indicative of intrinsically random properties of a component: power draw over time, current draw over time, electric field over time and/or space, or magnetic field over time and/or space. These example signals may be indicative of the inherent noise signature of the component when measured during an idle state.

The sensing can be conducted while the component runs in a default background mode or an idle state. In one embodiment, the component is connected to a constant voltage source, ground, and an external clock signal. As the external clock signal changes, the intrinsic random properties of the component affect the signals being sensed. For example, the amount of current draw on Vcc changes when the external clock signal transitions. Further, the electric field and magnetic field may be affected by external clock signal transitions. The sensing may be conducted after reaching steady state.

Segmenting each signal may include converting an analog signal into a set of discrete values that represent the signal. The segmented signal may be referred to as a feature vector. In some embodiments, sensing and segmenting may be conducted as a single step where measurements of a signal are obtained and stored in a feature vector.

Figure 5:
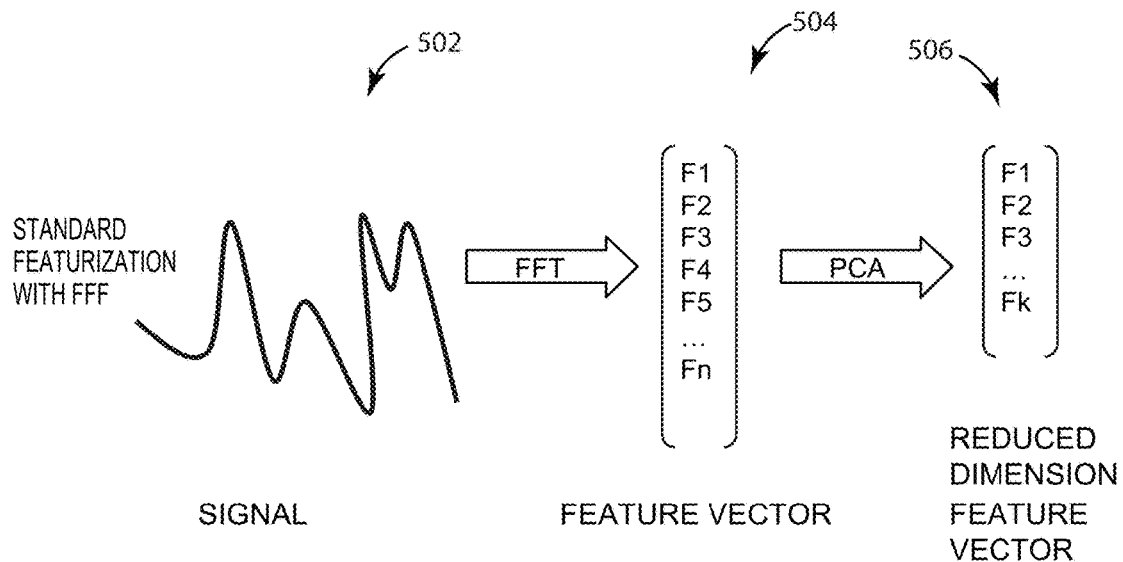
FIG. 5 illustrates a flow diagram of featurization of an intrinsic deterministically random noise signal including segmentation, transformation, and dimension reduction.

The feature vector can be transformed 114 into the frequency or a different time independent domain. In one embodiment, each feature vector is transformed with a discrete fourier transform (DFT) or fast fourier transform (FFT). FIG. 5 illustrates a fast fourier transformation of a captured waveform 502 to a feature vector 504 and application of principal component analysis to reduce the dimensionality of that vector 506.

Figure 6:
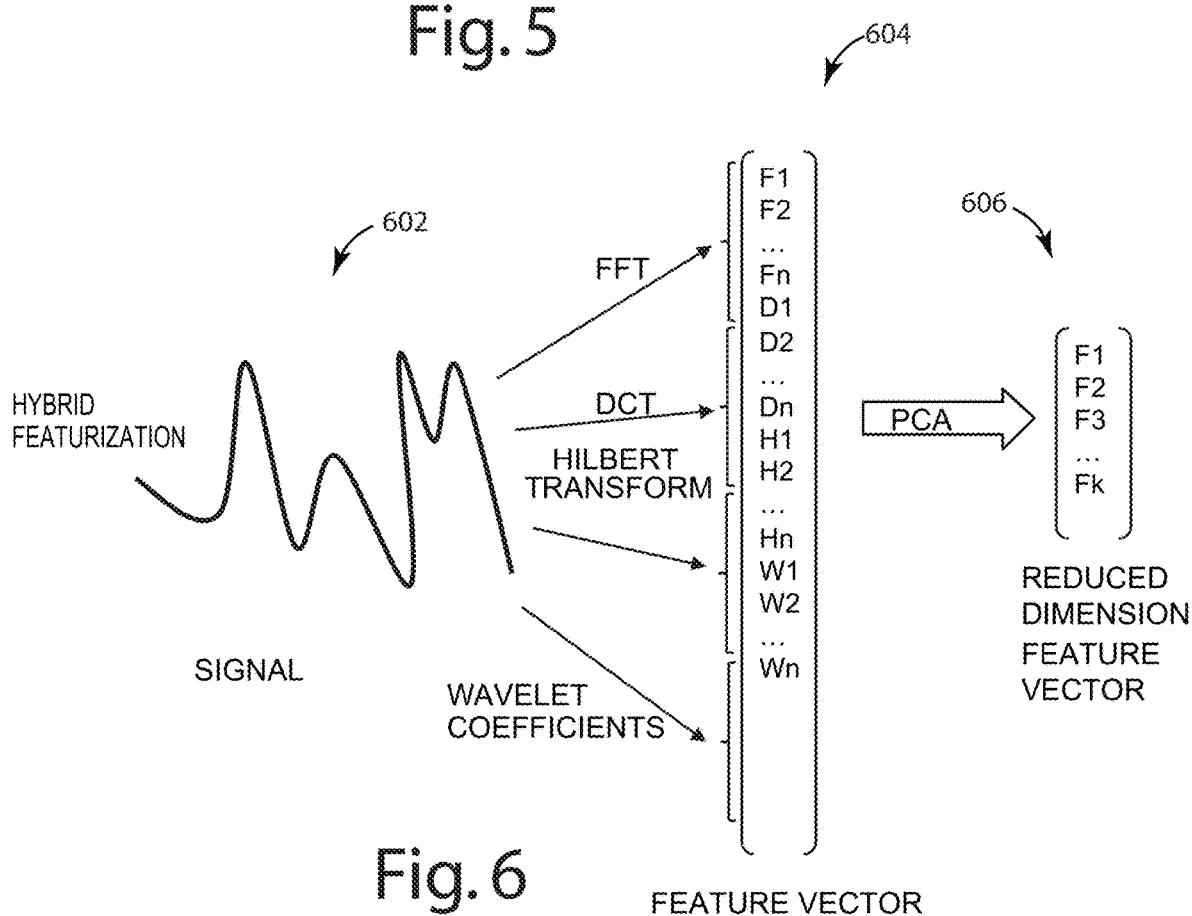
FIG. 6 illustrates a flow diagram of featurization of an intrinsic deterministically random noise signal including segmentation, hybrid transformation, and dimension reduction.

In alternative embodiments, each feature vector may be transformed with a discrete cosine transform, Hilbert transform, real cepstrum, wavelet coefficients, or a hybrid of several different transforms. FIG. 6 illustrates one embodiment of a hybrid transformation of a captured waveform 602 to a feature vector 604 and application of principal component analysis to reduce the dimensionality of that vector 606. The hybrid transformation may include full transformations of the feature vector using different transformation methods, where the results of each transformation are concatenated together. By conducting the hybrid transformation in the same manner for each component signal, additional data that can be helpful in distinguishing between component classes may be included. For example, by using a hybrid transformation it may be possible to increase component classification confidence because certain transformations may provide more or less differentiation between different classes. For example, it may be easier to distinguish between two component classes using a Hilbert transform, but easier to distinguish two other component classes using a fast Fourier transformation. Use of the hybrid transformation increases the amount of differentiation between feature vectors, which can increases confidence in classification.

The dimension of the feature vector can be reduced using essentially any known dimension reduction technique 116. For example, principal component analysis (PCA) can be conducted to reduce dimensionality. PCA transforms the feature vectors into a space where the greatest variance between samples is in the first dimension, the next greatest variance in the next dimension and so on. By organizing the feature vectors by greatest variance, dimensions where the least variance between samples occurs can be discarded in order to enable comparisons in a lower dimensional space with conventional distance metrics. Although the current embodiment implements PCA, other non-linear analysis techniques may be employed instead such as self organizing maps or other manifold based learning algorithms. In one embodiment, principal component analysis on the feature vector to reduce dimensionality of the feature vector includes organizing the feature vector by variance and discarding dimensions where the variance is below a threshold. In another embodiment, principal component analysis on the feature vector to reduce dimensionality of the feature vector includes organizing the feature vector by variance and discarding all but a predefined number of dimensions that have the highest variance.

In one embodiment, processed signals may be sub-clustered before principal component analysis and clustering analysis. In general, principal component analysis finds the greatest variation among a set of vectors, where each vector represents a unique class. In some embodiments, multiple measurements are obtained for components within each class so the data may include multiple vectors per unique class (i.e., 100 vectors per class). In this way, each unique class can be made up of some smaller number of sub-classes (i.e., about 5 sub-classes per class). By conducting principal component analysis on all of the vectors, some of the variation is intra-class/sub-class, meaning that the principal component analysis is optimizing partially for the differences in measurements of the same class. For example, a more desirable result may be obtained for a given class by feeding one vector for each sub-class, instead of many vectors for each sub-class. For example, if there are 5 sub-classes, by inputting only 5 vectors for that chip class into the PCA algorithm (one for each sub-class), a more accurate result may be achieved by feeding in many vector measurements for each sub-class. By pre-clustering the data into sub-classes, and outputting a set of representative vectors for those sub-classes for each class via hierarchical clustering, we can avoid or reduce focus in the principal component analysis on intra-class variations. One benefit of this approach is that by inputting fewer sub-class vectors into the PCA algorithm, the algorithm can be run quicker and can focus on optimization for the differences in classes and sub-classes instead of the variability in a large number of sample measurements.

Figure 14:
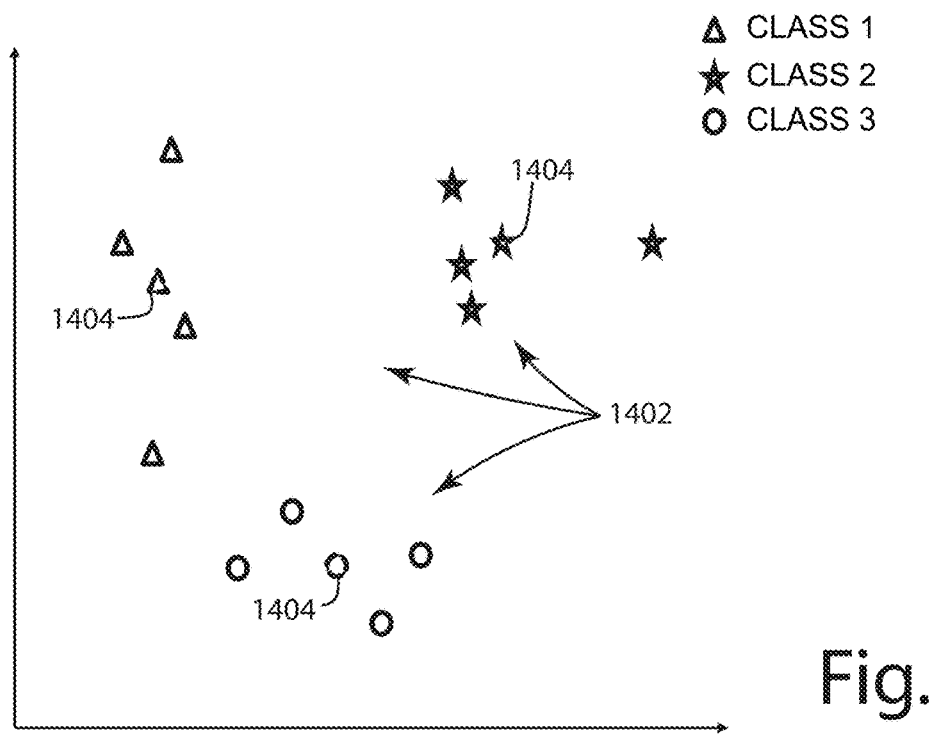
FIG. 14 illustrates an example of sub-clustering.

Put another way, in one embodiment before conducting a principal component analysis on all vectors, a sub-clustering analysis can be performed in order to find representative samples for each class so that when PCA is conducted, the focus can be on the variation between classes, instead of the variation inside of each class. FIG. 14 shows a representative visualization to illustrate this concept. In the depicted embodiment, instead of conducting PCA on all 12 vectors 1402, three representative vectors 1404 are identified—one for each class and PCA is applied to only those three vectors. In alternative sub-clustering embodiments, multiple vectors may be identified for each class instead of a single vector. Further, in the depicted embodiment, the identified vector represents an average of the class vectors. In alternative embodiments, averages between nearby vectors within a class may be identified or a single vector may be selected as a representative vector instead of creating an artificial compromise vector.

One embodiment of using the classifier on an unknown component or sample generally includes the following steps: sensing 120, segmenting 122, transforming 124, applying dimension reduction 126, and classifying 128. In general, the processing of the unknown component proceeds similarly to the processing of the authentic electronic components during classification. Where principal component analysis is utilized to build the classifier and a transform matrix is created, that same transform matrix may be used to order and reduce the dimension of the unknown sample, as opposed to running an entire PCA analysis. The classify step generally includes comparison of the processed signal of the unknown component in the feature space to the processed signals of the authentic components in the feature space. Some simplified examples of this comparison are illustrated in FIGS. 7-10, which will be discussed in more detail below.

Figure 7:
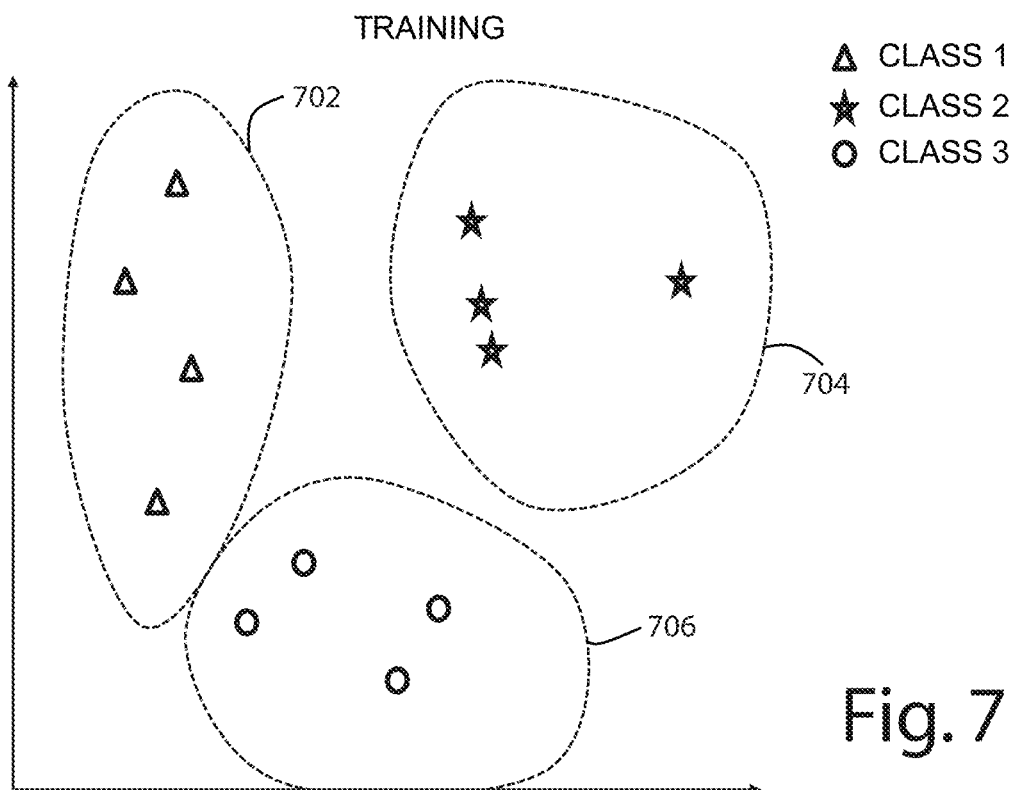
FIG. 7 illustrates a visualization of an examplary classifier.
Figure 8:
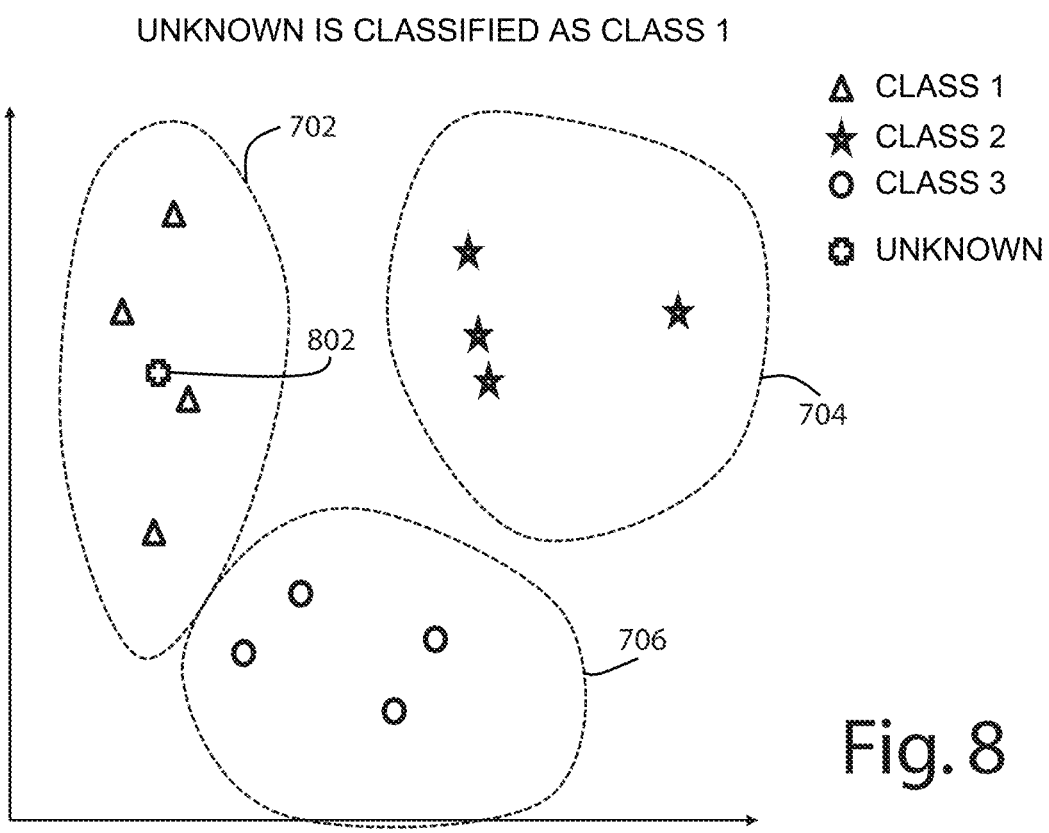
FIG. 8 illustrates a two-dimensional visualization of an exemplary classification of an unknown component.
Figure 9:
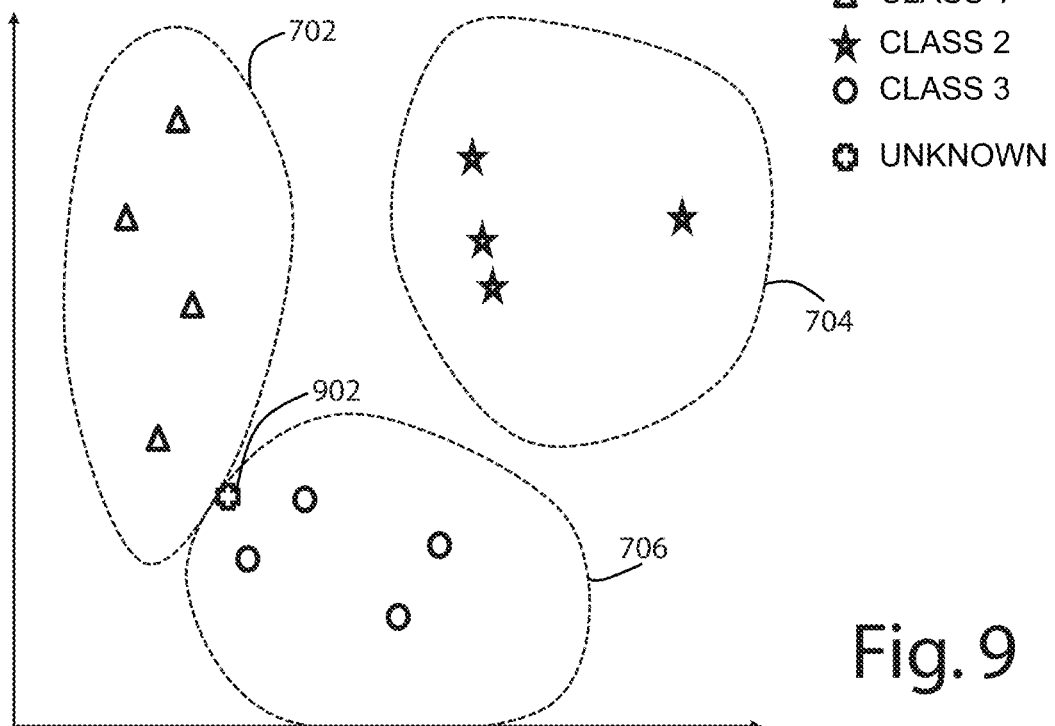
FIG. 9 illustrates another two-dimensional visualization of an exemplary classification of an unknown component.
Figure 10:
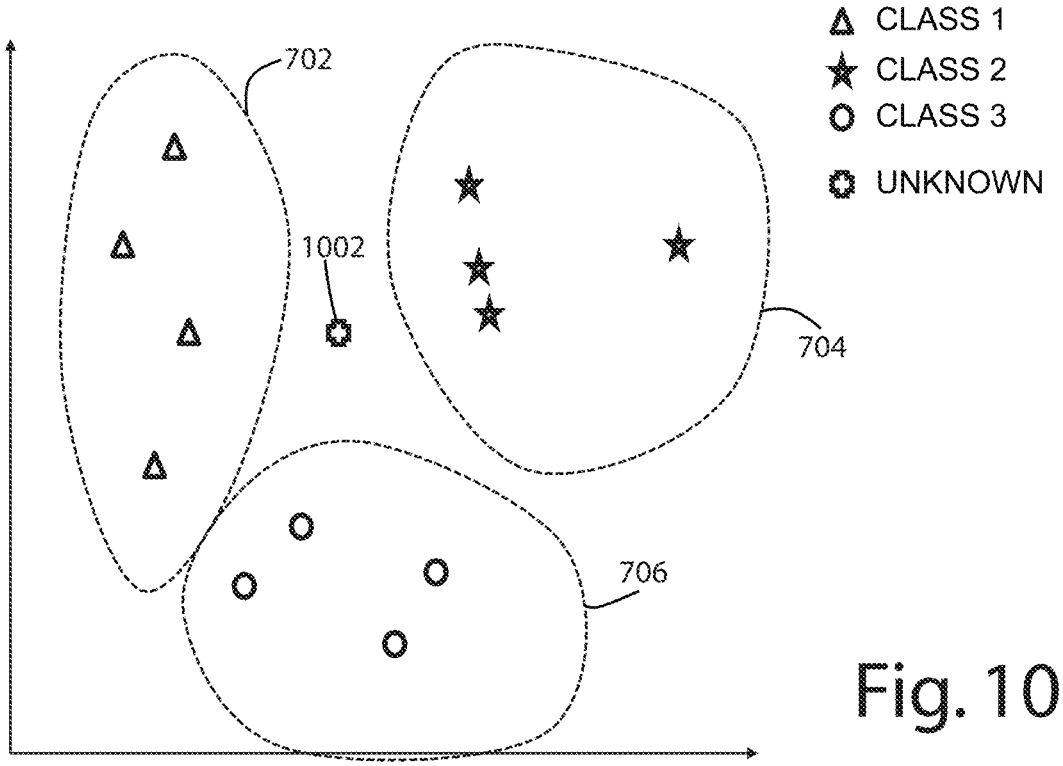
FIG. 10 illustrates another two-dimensional visualization of an exemplary classification of an unknown component.

FIG. 7 illustrates a plot of the first two dimensions of an exemplary set of processed vectors of authenticated electronic components for enrollment. In the illustrated example, there are twelve signals plotted from three component classes. Each circle, triangle, or star represents one signal, or processed vector. Although FIG. 7 illustrates the first two dimensions of these vectors, it is possible that the vectors may include many additional dimensions. For example, in one embodiment, after dimension reduction, the vectors include 20 dimensions. The three different areas 702, 704, 706 each encompassing four vectors, illustrate a representational boundary for the three component classes. In the illustrated embodiment, a modified shared nearest neighbor clustering analysis generates the thresholds outlined by areas 702, 704, 706. FIG. 8 illustrates how an unknown component 802 can be mapped into this feature space in order to be classified. In FIG. 8, the unknown component 802 falls within the boundaries of the class 1 area 702 and therefore can be classified as a class 1 component. In FIG. 9, a different unknown component 902 falls within the boundaries of the class 3 area 706 and therefore can be classified as a class 3 component. In FIG. 10, a different unknown component 1002 falls outside the boundaries of all of the known classes 702, 704, 706 and therefore can be identified as counterfeit or as unknown component class.

The modified shared nearest neighboring clustering algorithm starts with standard k nearest neighbor, where we create a graph based on the distance between all pairs of points in the data set and a link is created for the k closest point for every point. We then remove all non-symmetric links and weight the graph, which yields a standard shared nearest neighbor clustering graph. The enhanced version then also removes points it believes to be noise, that is links and points with low connectivity. We then select the highest connectivity points and form our clustering graph with them and all points directly connected to them.

Although the current embodiment is described in connection with a shared nearest neighbor algorithm, in alternative embodiments a different clustering analysis may be conducted. For example, unmodified shared nearest neighbor or a k-means clustering analysis may be implemented.

By clustering multiple classes, the electronic component authentication system can simultaneously detect whether a component is a number of different classes simultaneously. Without clustering, it may only be possible to determine whether an electronic component is a single class at a time, which can make electronic component authentication time consuming.

The boundaries of the component class can be set by the clustering analysis 118. Although FIGS. 7-10 illustrate two dimensional plots, it should be understood that the boundaries of each component class can be defined in feature space commensurate with the number of dimensions of the feature vectors. For example, if the feature vectors are three dimensions, then the boundaries for each component class may be represented in three dimensions. If the feature vectors are twenty dimensions, then the boundaries for each component class may be represented in twenty dimensions. Further, it should be understood that FIGS. 7-10 are representative diagrams designed to allow visualization of classification—the classifier or electronic component authentication system need not provide or generate such visualization. The distance between an unknown component and the authenticated training data can be calculated without visualization by a controller and the classification can be determined mathematically based on the distance. For FIGS. 7-10 where only two dimensions are in play, Euclidian distances are helpful and accurate. In alternative embodiments with a larger number of dimensions, distance calculations between vectors may be conducted using cosine distance calculations, or other non-Euclidean distance calculation techniques.

Figure 11:
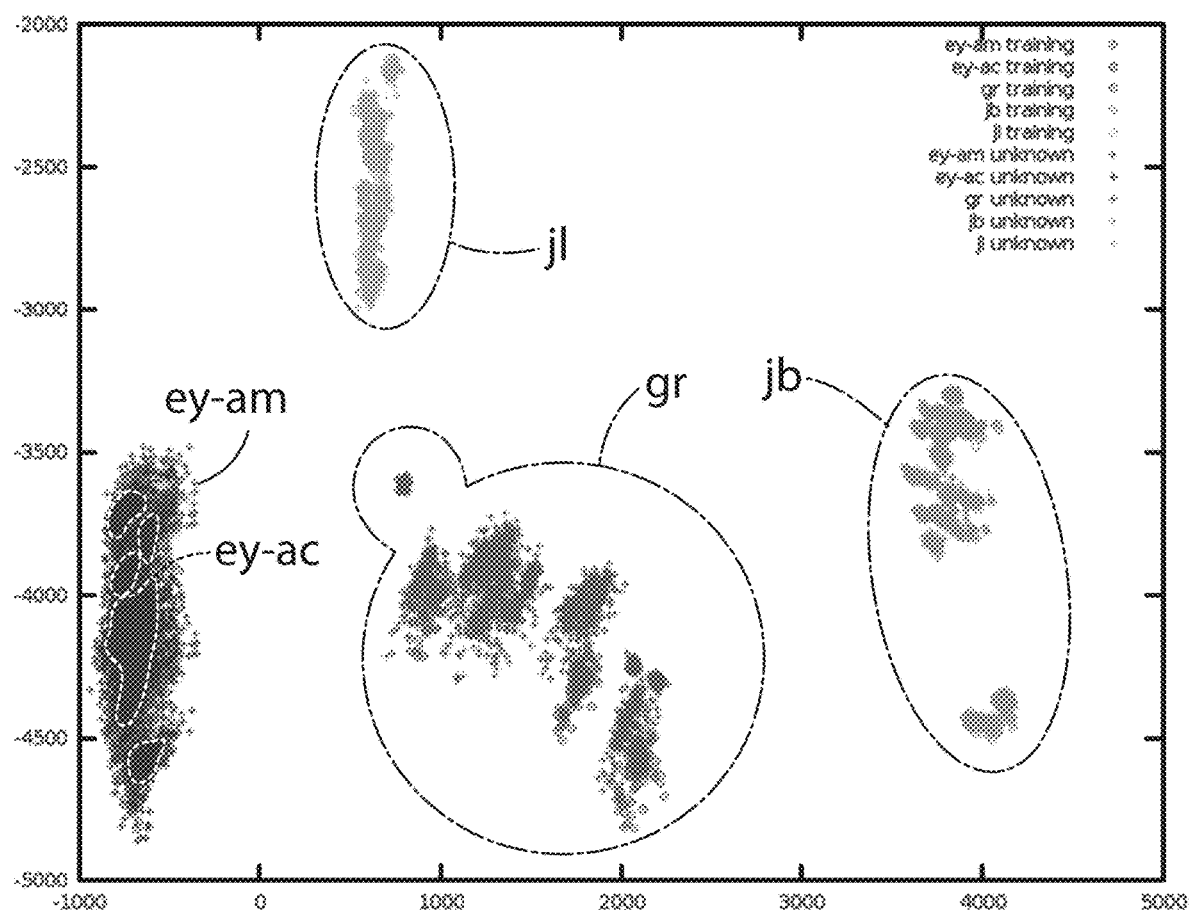
FIG. 11 illustrates a two-dimensional visualization of an exemplary classification of five unknown components.
Figure 13:
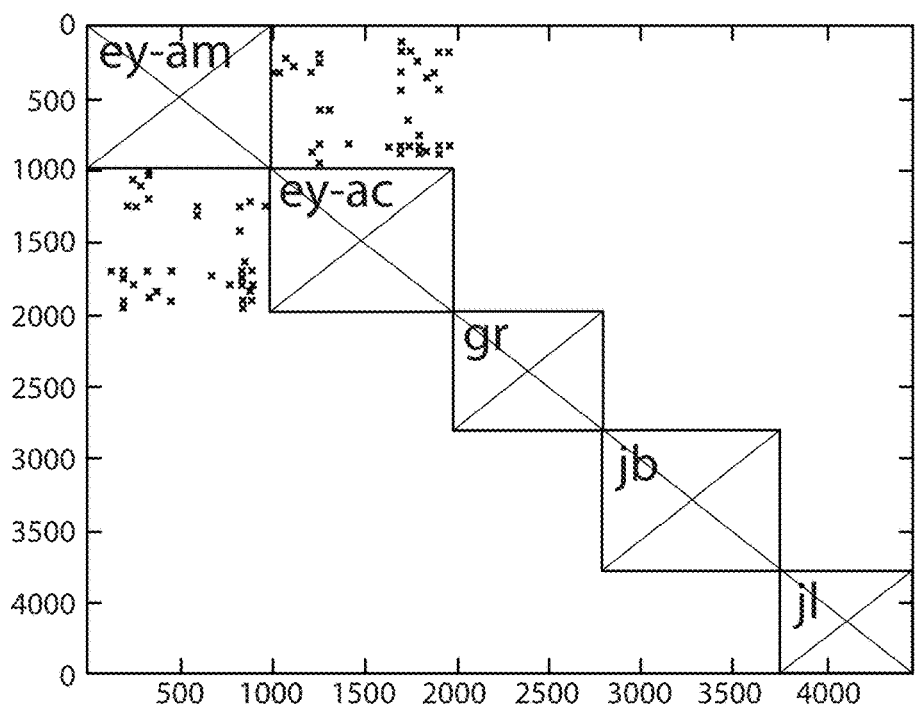
FIG. 13 illustrates an exemplary spy graph of five components.

FIG. 11 illustrates the results of another exemplary shared nearest neighbor cluster analysis with four samples of five different component classes ey-am, ey-ac, gr, jb, and jt. In addition, five unknown samples that each purport to be one of the five component classes are mapped into the feature space. Again, the illustrated visualization displays two dimensions of the reduced dimension vector. In the illustrated embodiment, two chips or components that differ only by their thermal performance specification, ey-ac and ey-am are mapped to the feature space. As shown, using only two dimensions, it may be difficult to differentiate between ey-ac and ey-am classes. However, the ability and confidence in differentiation between ey-ac and ey-am chips can be increased by factoring in additional dimensions of the feature vector. For example, considering twenty different dimensions may enable a classification system to differentiate between not only different classes that have different functionality, but also different chip classes that share identical functionality but have different performance characteristics, such as thermal performance. FIG. 13 shows a spy graph visual representation of a classifier for the same five component classes.

In the current embodiment, the clustering and classifier results of FIG. 11 are for four specimens from each of five slightly different chip classes. In alternative embodiments, additional or fewer specimens for additional or fewer chip classes may be obtained. In the current embodiment, all of the chips were based on the same central processing unit with different modules, and two of the chips were identical with the exception that one has a preferred thermal performance (and thus is a more expensive part but manufactured on the same line). The classifier trained on one of the specimens of each chip class and then processed the power signals from the other 3 specimens in each class as an unknown.

FIGS. 12A-12D illustrates several spy graph visualizations of representative classification results for three components, two of which are related RFa, RFb and one of which is unrelated GZ60. The spy graphs show the range of possible results depending on how the parameterization is applied to create identity vectors. FIG. 12A illustrates non-distinguishing parameterizations, whereby the intrinsic property data cannot be used to meaningfully distinguish between the three components. FIG. 12B illustrates unique individual parameterization whereby each and every part from a trusted source has unique physically unclonable features that can be measured and recorded. In this scenario, the unique physically unclonable features for every component allow tagging, serialization and tracking for every component—even related components can be easily distinguished. FIG. 12C illustrates poor class parameterization where differentiating between related components can be accomplished confidently, but it may be challenging to differentiate between unrelated components. FIG. 12D illustrates unique class parameterization where differentiating between unrelated components can be accomplished confidently, but it may be challenging to differentiate between related components. In this configuration, by measuring physically unclonable feature fingerprints of a few authentic parts from each class and enrolling those classes in the classifier it is possible to identify the class of component.

Figure 23:
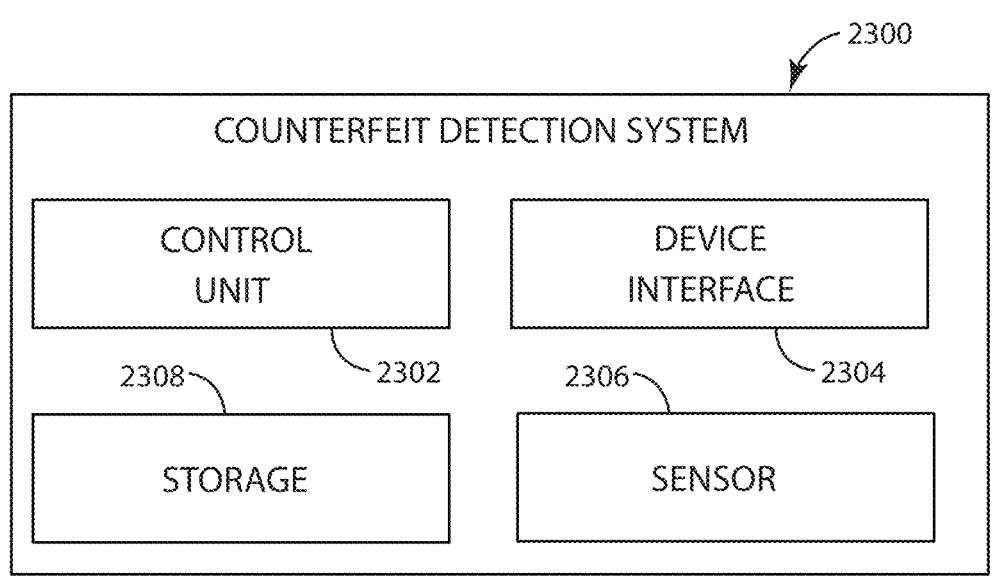
FIG. 23 illustrates a block diagram for one embodiment of an electronic component authentication system.

FIG. 23 illustrates one embodiment of a electronic component authentication system or component classification system 2300. The system generally includes a control unit 2302, a component interface 2304, a sensor 2306, and storage 2308. The component interface 2304 enables a component to be connected to the electronic component authentication system for examination. The sensor can measure an intrinsic noise waveform of the component and communicate to the control system. The control system can process the intrinsic noise waveform. The control system can build a classifier by processing and clustering multiple intrinsic noise waveforms of authentic components. The control system can classify an unknown component by processing its intrinsic noise waveform or other intrinsic property data and inputting it to the classifier. In one embodiment, the control unit can provide a classification of an unknown component and a confidence rating.

Figure 24:
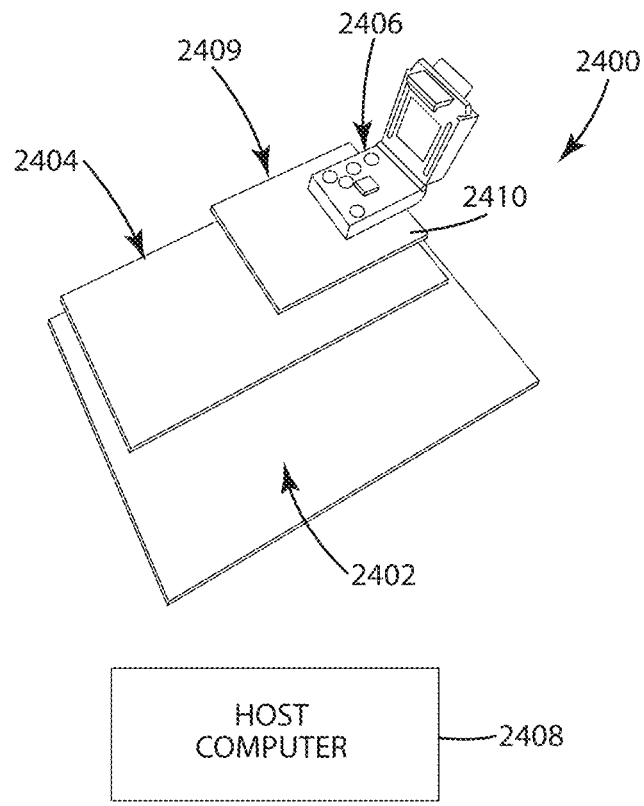
FIG. 24 illustrates one embodiment of an electronic component authentication system.

FIG. 24 illustrates another embodiment of an electronic component authentication system or component classification system 2400. The electronic component authentication system may include a development board 2402, an interface board 2404, one or more personality boards 2406, and a host computer 2408. The development board 2402 and host computer 2408 can act in concert as a control unit and storage. The personality board can provide an interface for an electronic component and the interface board may include a sensor for collecting intrinsic property data about the electronic component. In concert, the personality board, interface board, development board, and host computer constitute hardware that can be used to acquire intrinsic property data, such as the power consumption signature of an electronic component.

Figure 27:
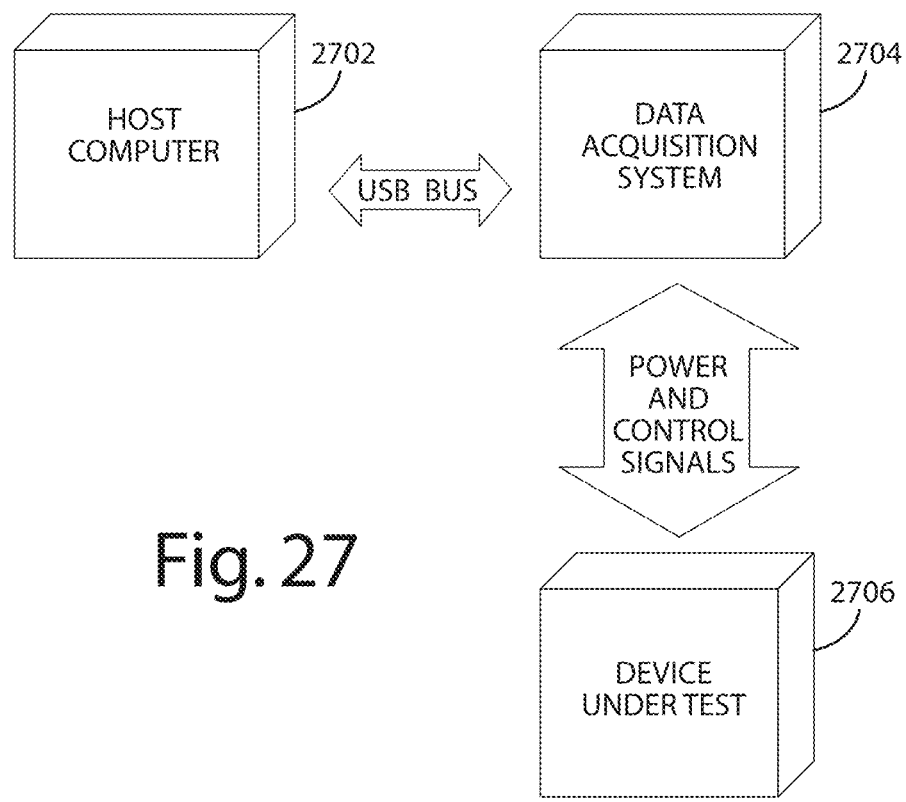
FIG. 27 illustrates a block diagram of one embodiment of a classification system

FIG. 27 illustrates a block diagram of another embodiment of an electronic component authentication system or component classification system 2700. The system includes a host computer 2702, a data acquisition system 2704, and a device under test 2706. The host computer can be connected to the data acquisition system by a USB bus. Power and control signals can be transferred between the data acquisition system and the device under test.

Figure 28:
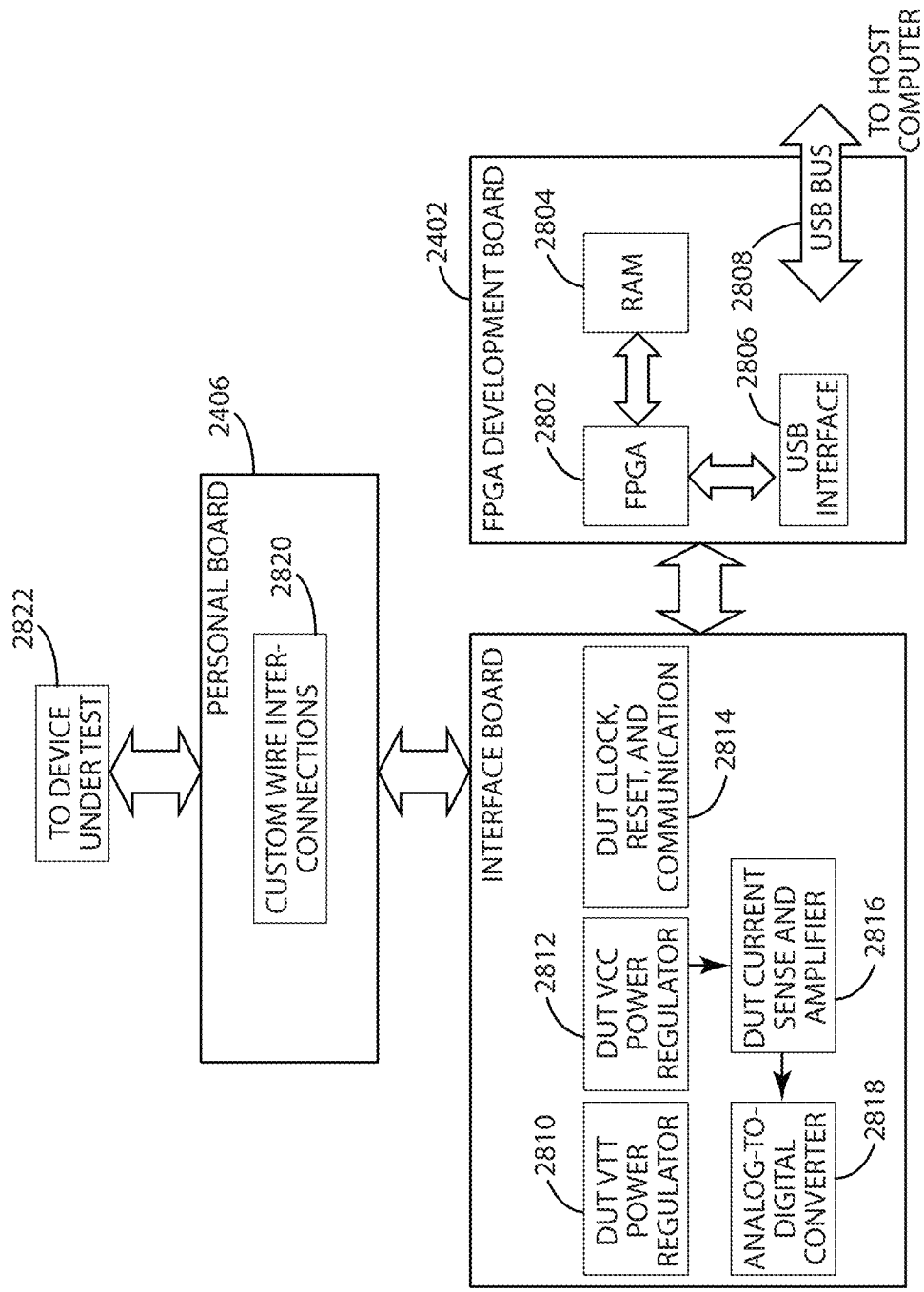
FIG. 28 illustrates a block diagram of another embodiment of a classification system.

A block diagram of one embodiment of the electronic component authentication system or component classification system 2400 is illustrated in FIG. 28. The electronic component authentication system may include an FPGA development board 2402 that includes an FPGA 2802, RAM 2804, a USB interface 2806 and a USB bus 2808 connected to a host computer. The system may include an interface board 2404 that includes a DUT vtt power regulator 2810, a DUT Vcc power regulator 2812, DUT clock, reset and communication circuitry 2814, DUT current sense and amplifier 2816, and an analog-to-digital converter 2818. The system may also include a personality board 2406 that includes custom wire inter-connections 2820. The system may also include a device under test 2822.

In the depicted embodiment, the development board is an AVNET development board. Specifically, the development board includes an LX16 evaluation kit, Xilinx Spartan 6 field programmable gate array that allows data from an analog to digital to be written to high speed RAM. The development board may include a USB or other interface for a host computer 2408.

Figure 26:
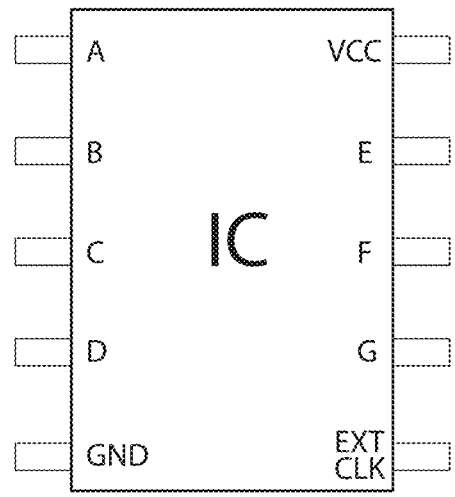
FIG. 26 illustrates a diagram of a representative integrated circuit.

The personality board provides an interface for the electronic component to the electronic component authentication system. In particular, the personality board includes an adaptor board 2409 and a chip carrier 2410 that is configured to accept an electronic component. For example, an electronic component may have a plurality of pins that connect to the electronic component authentication system in a specified way. For example, FIG. 26 illustrates an integrated circuit with 10 pins including 1 ground pin, 1 Vcc pin, and 1 external clock pin. All electronic components may not have the same pin configuration, for example the ground, Vcc, or external clock pins on the integrated circuit may be located at different positions. The personality board can map the ground, Vcc, and external clock to the correct locations in the electronic component authentication system. For example, the development board may provide a ground, Vcc source, and external clock that are routed through the interface board to the personality board.

Figure 25:
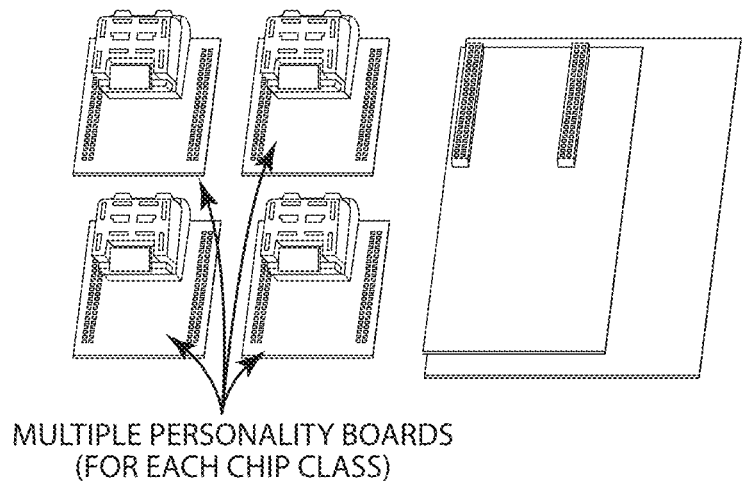
FIG. 25 illustrates multiple personality boards.

FIG. 24 illustrates an installed personality board that maps pins to interface board inputs. In the current embodiment, the personality board is removable and different personality boards can be installed that change the routing of the signals from the electronic component authentication system to route signals to different pin positions within a chip carrier. That is, by having multiple personality boards the same acquisition hardware can interface with multiple chips that do not share the same physical connection. FIG. 25 illustrates a plurality of personality boards, where each personality board includes a chip carrier designed to accommodate a specific chip class. Instead of having multiple different personality boards, a single dynamic personality board may accommodate multiple chip classes by dynamically mapping the pin routing.

Figure 15:
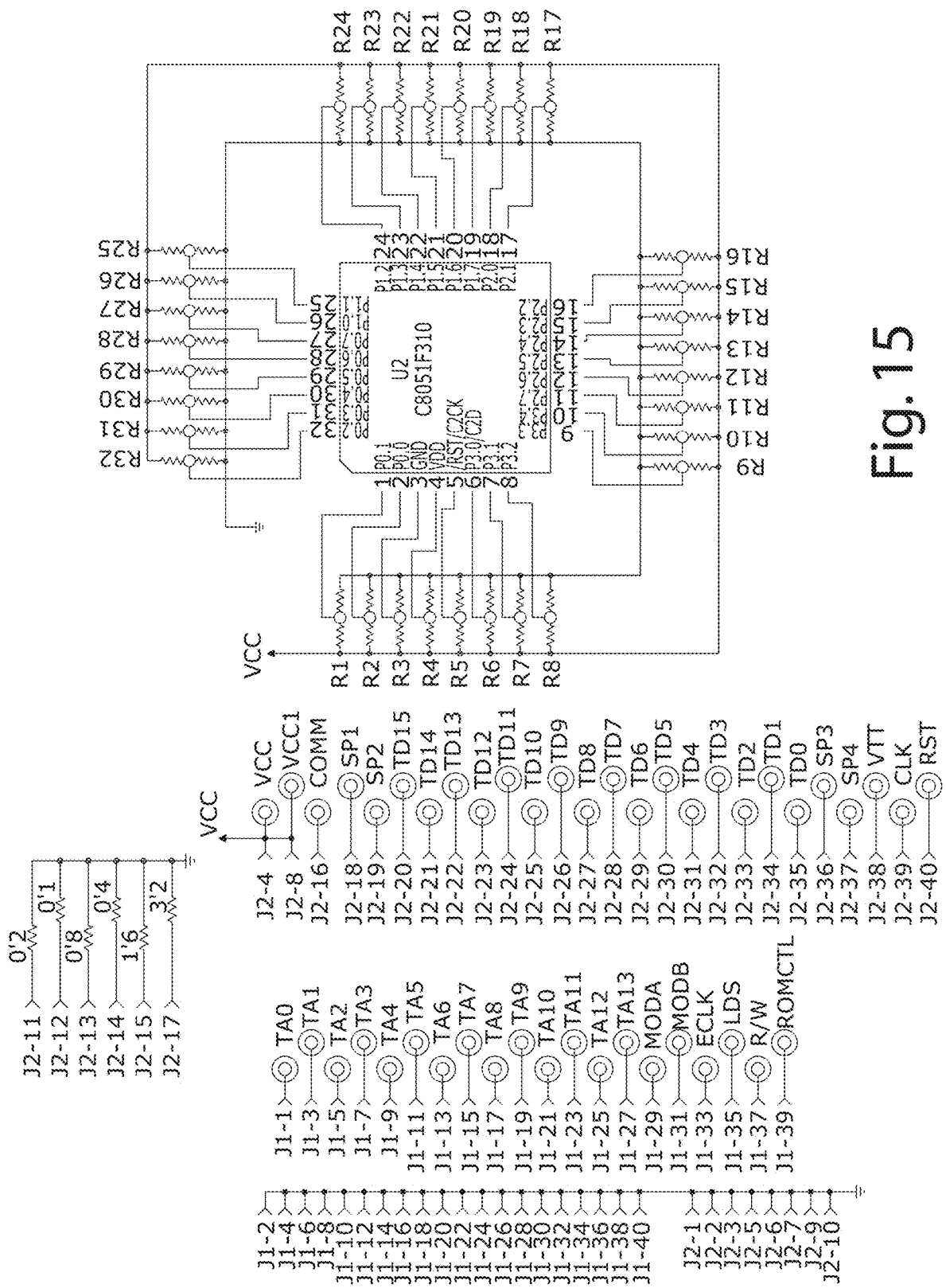
FIG. 15 illustrates an exemplary circuit diagram of a personality board.
Figure 16A:
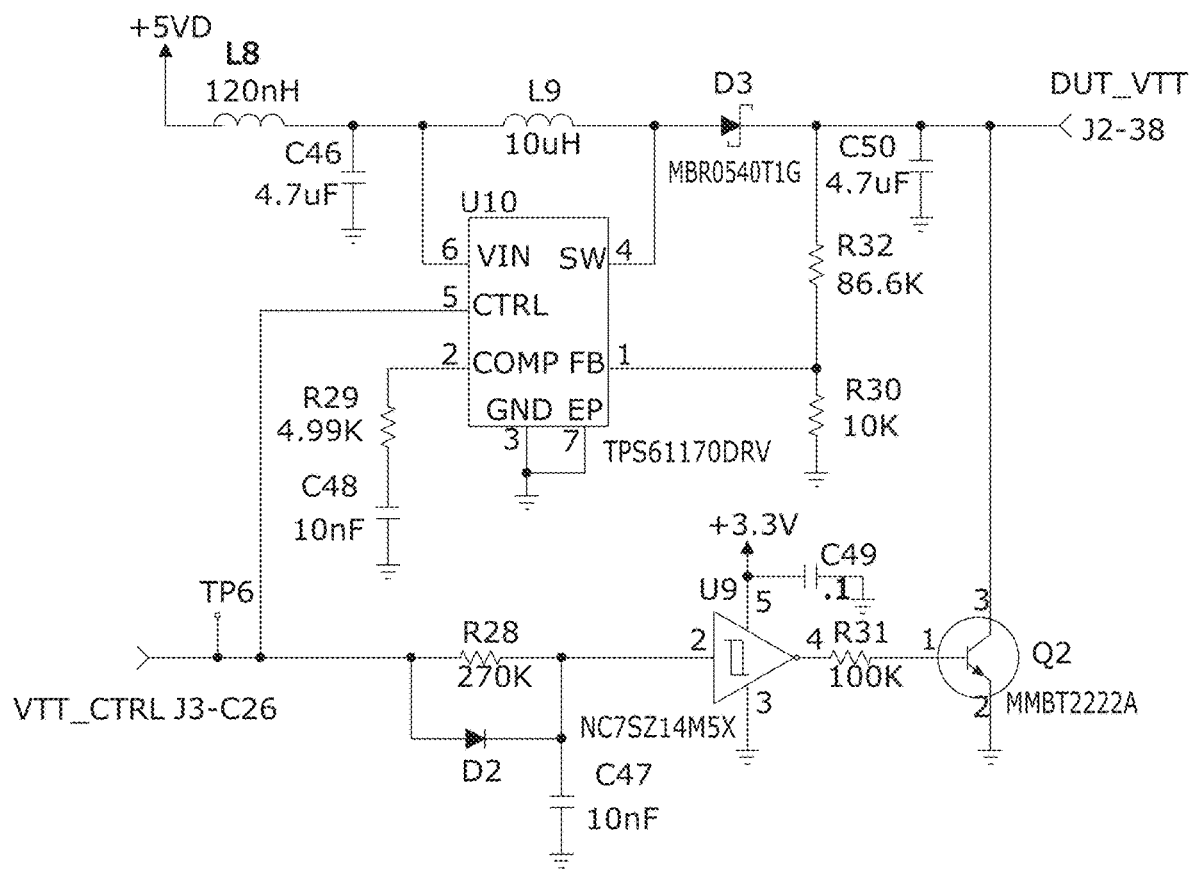
FIGS. 16A-H illustrate an exemplary circuit diagram of an interface board.
Figure 16B:
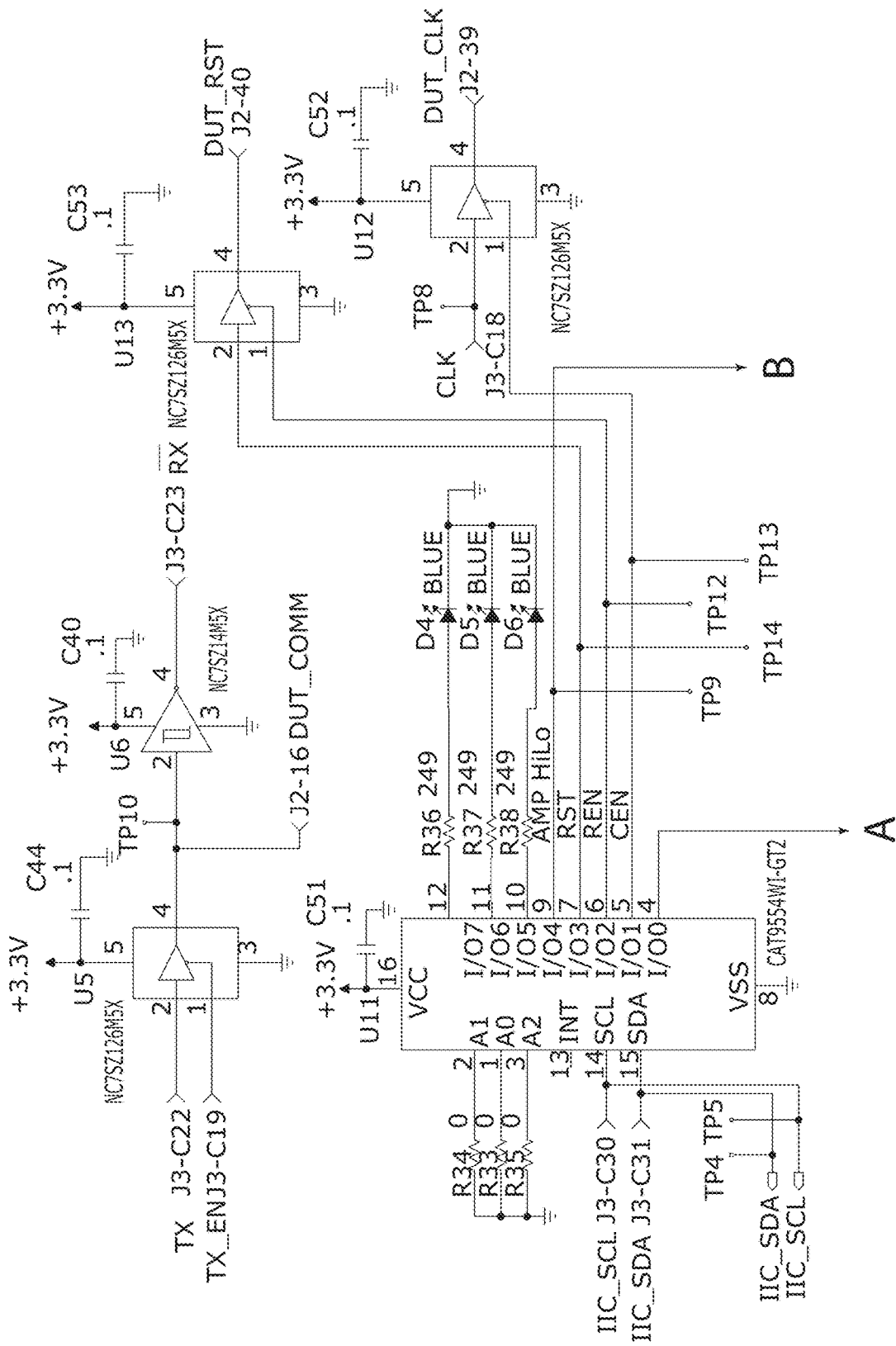
Figure 16C:
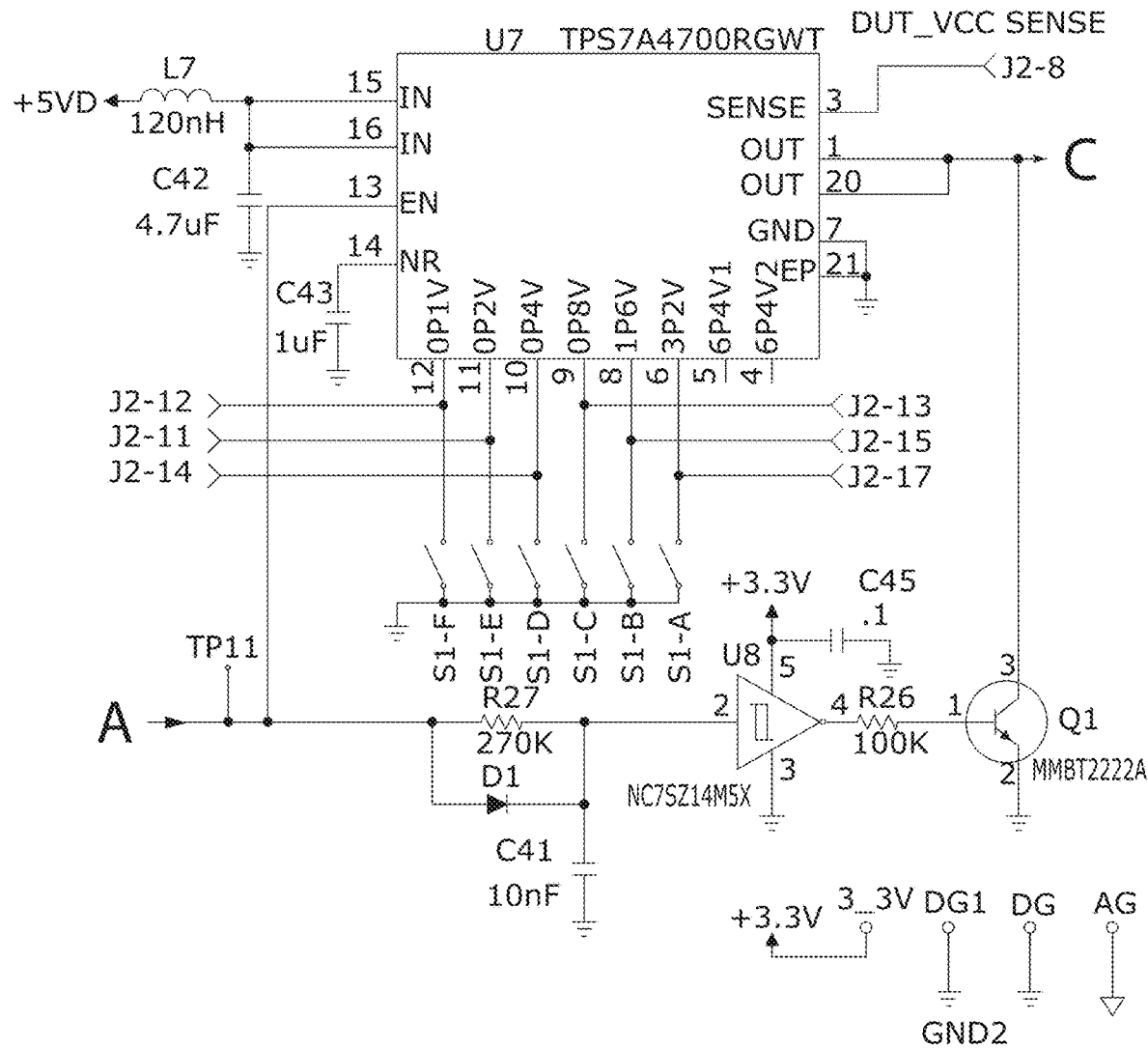
Figure 16D:
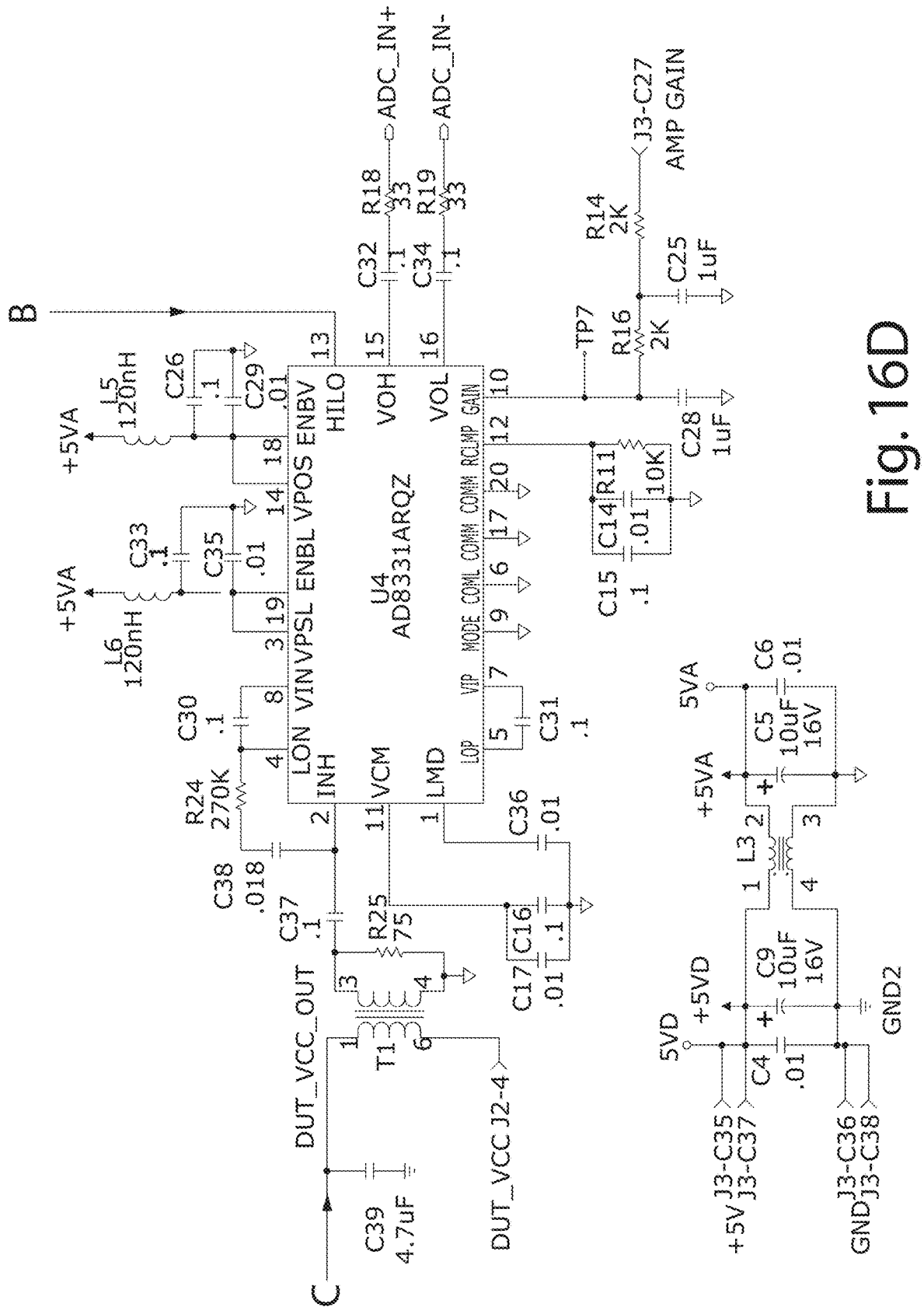
Figure 16E:
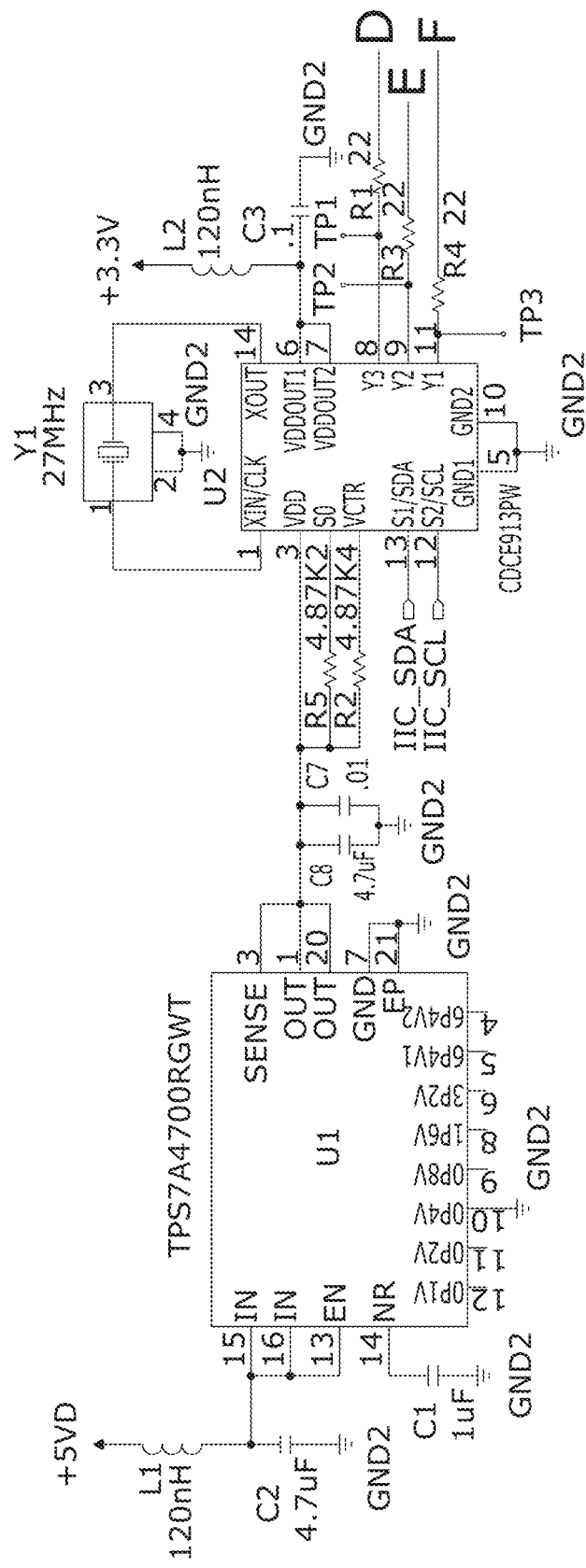
Figure 16F:
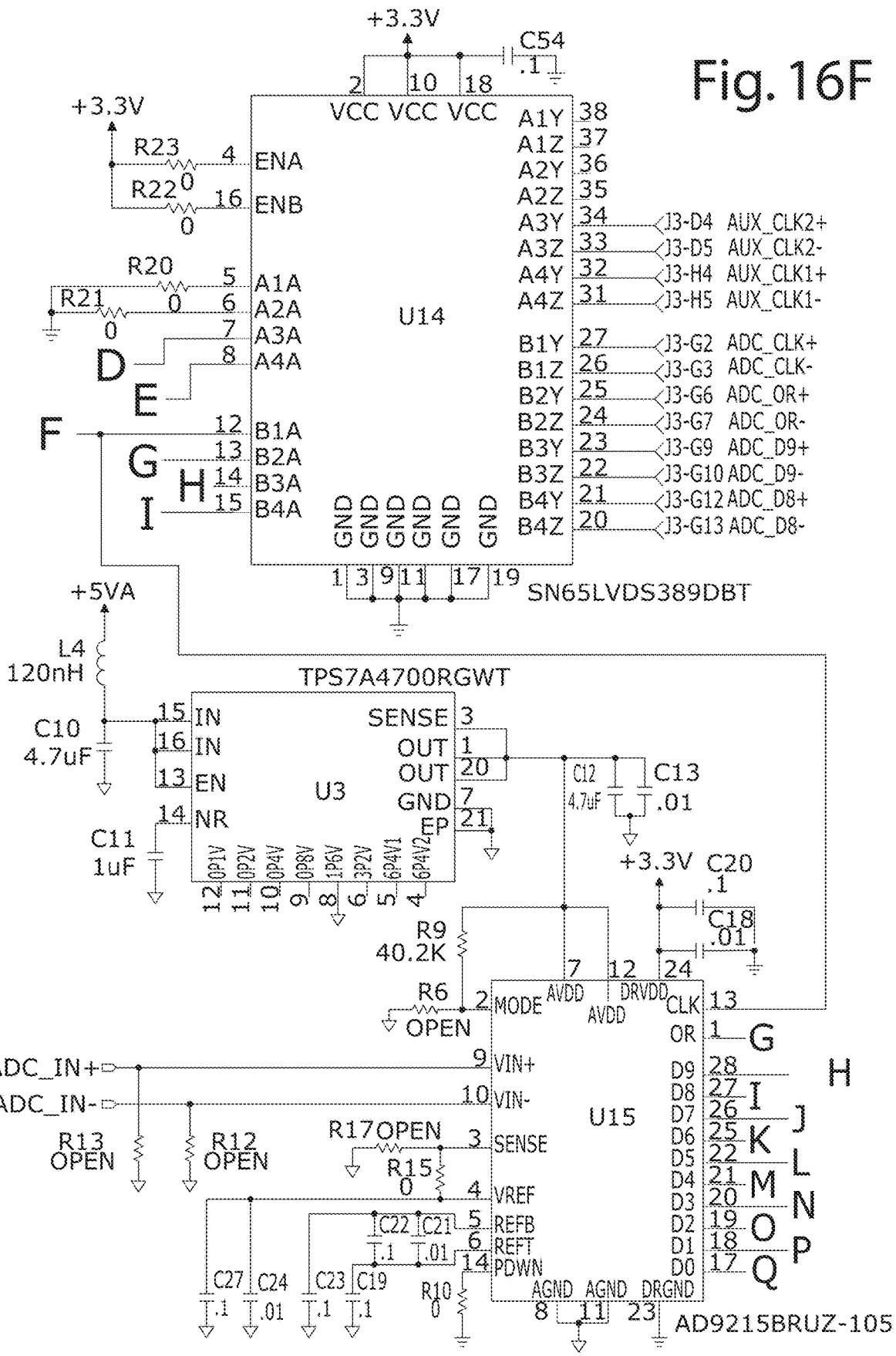
Figure 16G:
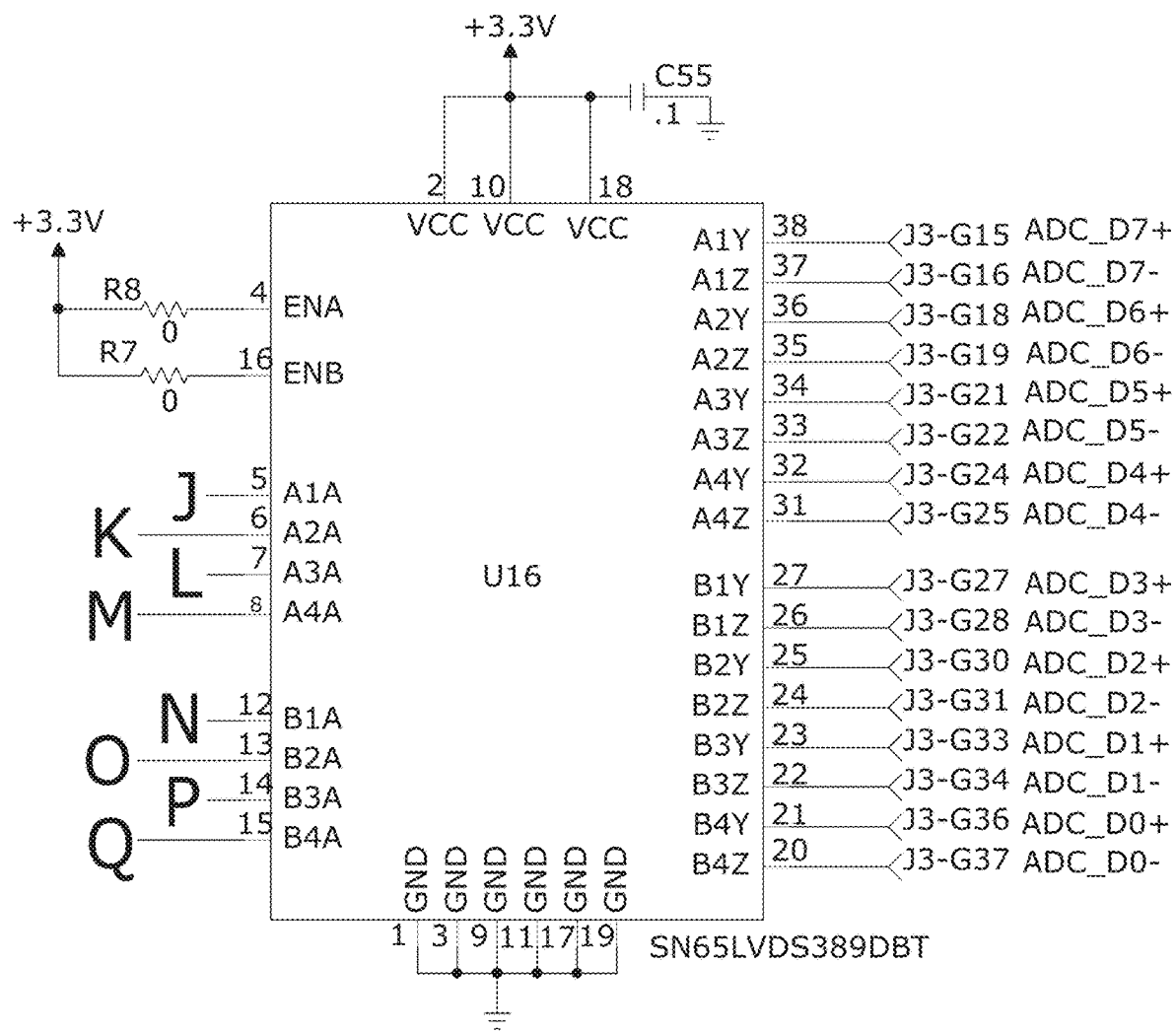
Figure 16H:
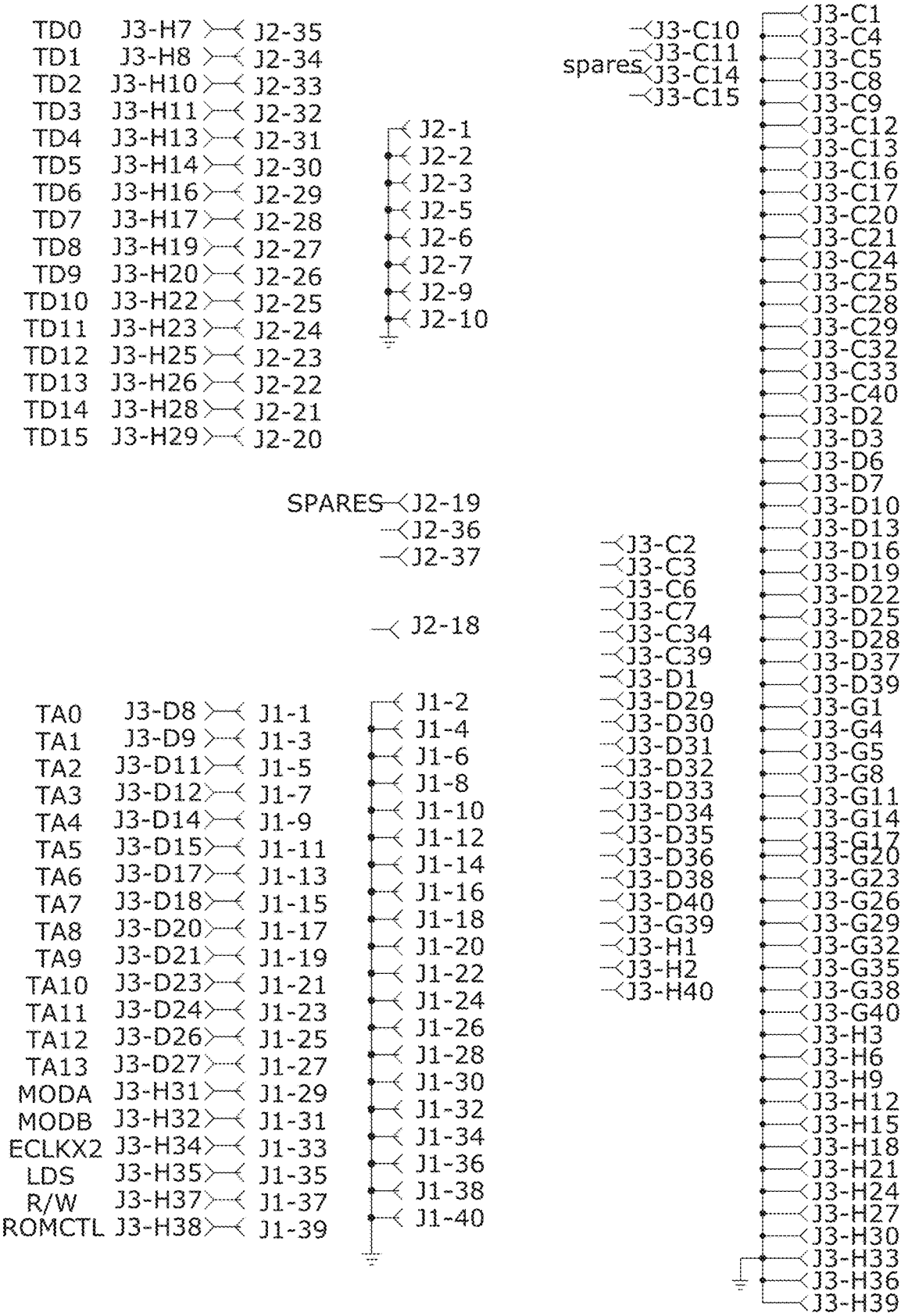

FIG. 15 illustrates one embodiment of a circuit diagram for a personality board. The personality board can be used to provide a custom interconnection between an interface board and the device or component under test (DUT). For every DUT under consideration, its power, ground, clock and reset signals can be connected to the corresponding signals on the interface board. In the case for MC68HC908 microcontrollers, the Vtt test voltage and the 1-wire communication signals can be connected so the microcontroller runs in a monitor mode. The power connections can be made by mounting zero ohm resistors to the pad corresponding to the appropriate DUT power pin and the Personality Board Vcc bus. Connections are likewise made to the DUT ground pins and the Personality Ground bus. Connection to the DUT clock is made by soldering a length of wire from the corresponding DUT clock pin to the personality board CLK pad (no zero ohm resistors are used in this case.) All other DUT signals made in likewise fashion. All other DUT pins are unconnected.

The personality board may include a plurality of jumpers that can be set to map the various connection to a subject electronic component according to its pin layout. The depicted personality board includes 32 pins, in alternative constructions the personality board may include additional or fewer pins. The depicted personality board is a low profile quad flat package, though in alternative embodiments a different package type may be utilized.

Depending on the intrinsic property data being collected, the interface board may or may not include a sensor for measuring intrinsic property data about the electronic component. In the depicted embodiment, the interface board includes a current or power sensor, an A/D unit for converting the analog signal to a digital signal, a ground connection, a Vcc or constant voltage source connection, and a signal generator. The signal generator can be used to standardize the intrinsic property data collected from various electronic components. In the current embodiment, the signal generator is a clock signal that is provided to an external clock input on the electronic component. The intrinsic property data collection can be obtained synchronously with the clock signal. In alternative embodiments, a different signal generator may replace the clock signal.

In some embodiments, a signal generator is unnecessary. For example, for some components, such as passive or analog components, intrinsic property data can be collected by measuring input power on the power source. By connecting one lead to a power source and another lead to ground, the intrinsic noise waveform can be measured in an analog component, which can be utilized to determine whether the unknown components are authentic (similar to the collected intrinsic noise waveform) or counterfeit (are not similar to the collected intrinsic noise waveform). A similar process for creating identity vectors for different classes of integrated circuits can be applied to passive analog components greatly expanding the range of electronic components to which the method described herein applies.

One embodiment of a circuit diagram for an interface board is illustrated in FIGS. 16A-16H. The interface board can provide functionality to stimulate the Device Under Test (DUT) and to measure the DUTs operating current. In the current embodiment, the interface board is controlled by an FPGA board, such as a Xillinx Spartan-6 LX16 Evaluation Kit. The functionality of the interface board can be described as follows:

DUT Vtt Generation.

U10 and its associated components include a step-up DC/DC converter which can provide a "test voltage", Vtt. The test voltage can be used by the microcontroller, such as the MC68HC908 microcontroller, to enable a "monitor mode" of operation. This allows the microcontroller to run in a known state. In alternative embodiments, the component may be configured differently in order to run in a known state. The DUT vtt generation circuitry is also illustrated in the FIG. 28 block diagram as reference 2810.

DUT Vcc Generation.

U7 and its associated components include a linear voltage regulator that supplies power, Vcc, to the DUT. The voltage can be configured by jumpers on the personality board to provide a particular voltage to the DUT. The DUT Vcc generation circuitry is also illustrated in the FIG. 28 block diagram as reference 2812.

DUT Clock and Control Signals.

U5, U6, U13, U12, and U11 provide control signals to the DUT. These include the clock signal (U12), reset (U13), and 1-wire communication (U5 and U6.) These signals can be enabled by a general-purpose port expander (U11.) The actual clock frequency and 1-wire serial data cab be generated off-board by the FPGA. The DUT clock and control signal circuitry is also illustrated in the FIG. 28 block diagram as reference 2814.

DUT Power Current Detection and Amplification.

The power current of the DUT can be detected by the transformer T1. The AC-coupled, high-frequency current signal is amplified by programmable-gain amplifier, U4. The DUT power current detection and amplification circuitry is also illustrated in the FIG. 28 block diagram as reference 2816.

Current Signal Digitization.

The amplified DUT power current is digitized by the high-speed, analog-to-digital converter (ADC), U15, and its associated components. The power for the ADC can be provided by the linear voltage regulator, U3. The high-speed digitized outputs of the ADC can be buffered by the differential line drivers, U14 and U16. The ADC output signals can connect to the FPGA board where they are captured and saved to RAM. The current signal digitization circuitry is also illustrated in the FIG. 28 block diagram as reference 2818.

Sample Clock Generation.

The sample clock for the ADC can be provided by the Phase-Locked-Loop (PLL) clock generator, U2 and its associated components. Power for the PLL can be provided by the linear voltage regulator, U1. The clock output of the PLL clocks both the ADC and the FPGA for synchronous sampling of DUT power current with DUT clock signal. The sample clock generation circuitry is also illustrated in the FIG. 28 block diagram as reference 2814.

The host computer connects to the development board and can receive the intrinsic property data, process the intrinsic property data, build a classifier based on sample intrinsic property data of authentic components, and use the classifier to identify whether a component is counterfeit or authentic based on intrinsic property data about an unknown component.

Figure 2:
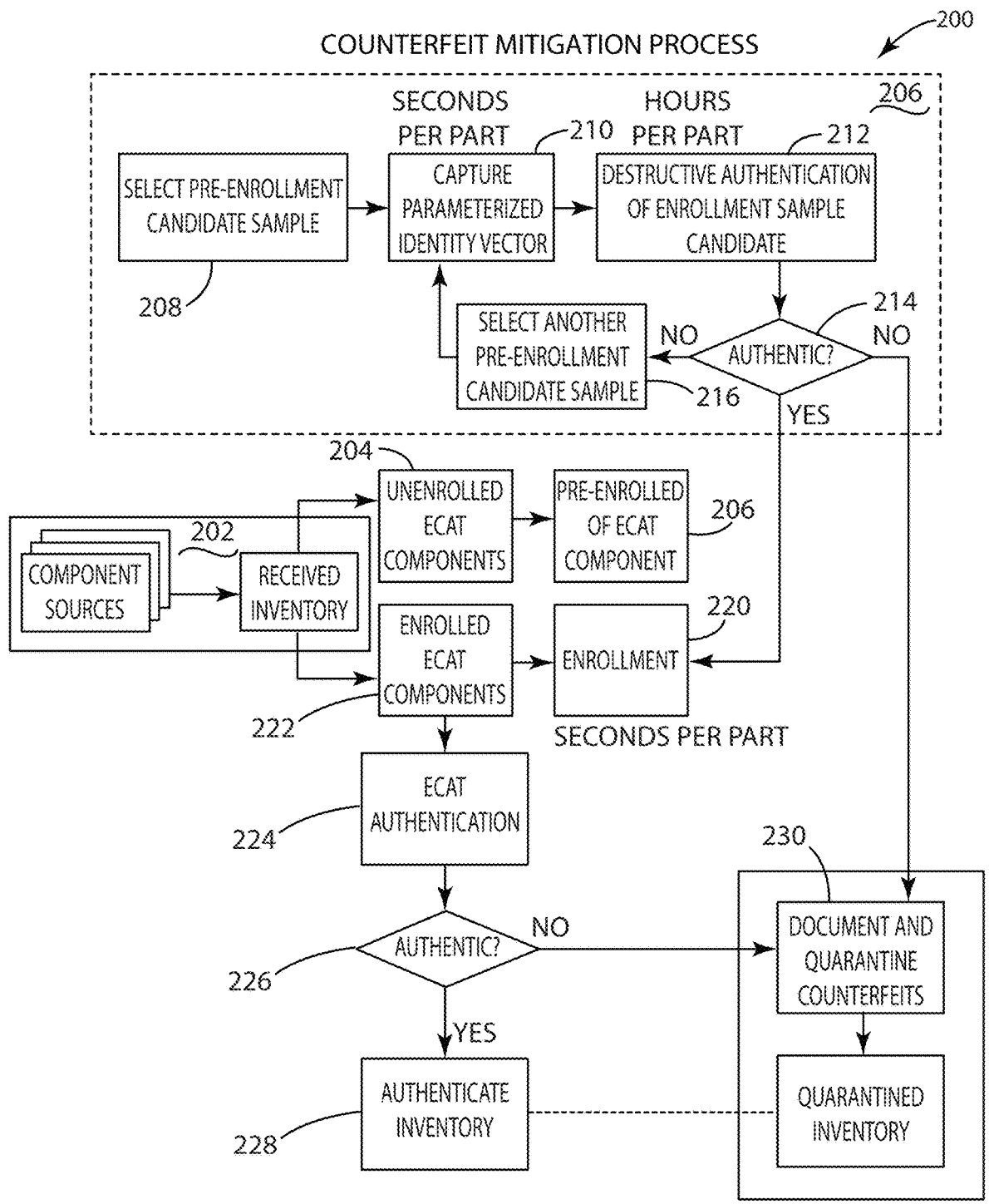
FIG. 2 illustrates one embodiment of a method of counterfeit mitigation.

FIG. 2 illustrates one embodiment of a counterfeit mitigation process 200. The process includes receiving a plurality of components each purporting to be a particular component or component class 202. Any components not belonging to a component class enrolled in the electronic catalog are subjected to an enrollment procedure 204. The enrollment procedure includes pre-enrollment 206 and enrollment 220. In the current embodiment, pre-enrollment is a multi-step process that includes selecting a pre-enrollment candidate sample 208 and capturing parameterized identify vector 210. For example, if multiple components from the same unenrolled component class are in the received inventory, the pre-enrollment process selects one of them as a candidate sample and obtains intrinsic property data about that sample. This may be done, for example, by measuring a power draw signal, an electric field signal, or a magnetic field signal that is indicative of an intrinsic noise signature. Once the intrinsic property data is collected, the sample can undergo destructive authentication 212 to determine whether the sample is authentic 214. If the sample is not authentic, then that sample is quarantined 230, and a different sample of the same component class is selected, if available, and the process is repeated 216. If the sample is authentic, then the intrinsic property data is used to enroll that component class into the electronic catalog so that future components can be classified based on the intrinsic property data captured during pre-enrollment for this class of component 220. In some embodiments, pre-enrollment may include collection of multiple signals indicative of intrinsic property data from the same or different authentic samples from the subject component class.

If the component class of a component is enrolled in the electronic catalog 222, then electronic catalog authentication is conducted to determine whether the component is authentic 226. If the component is determined to be authentic, then the component is authenticated inventory 228. If the component is determined to be counterfeit, then the component is quarantined 230.

Figure 3:
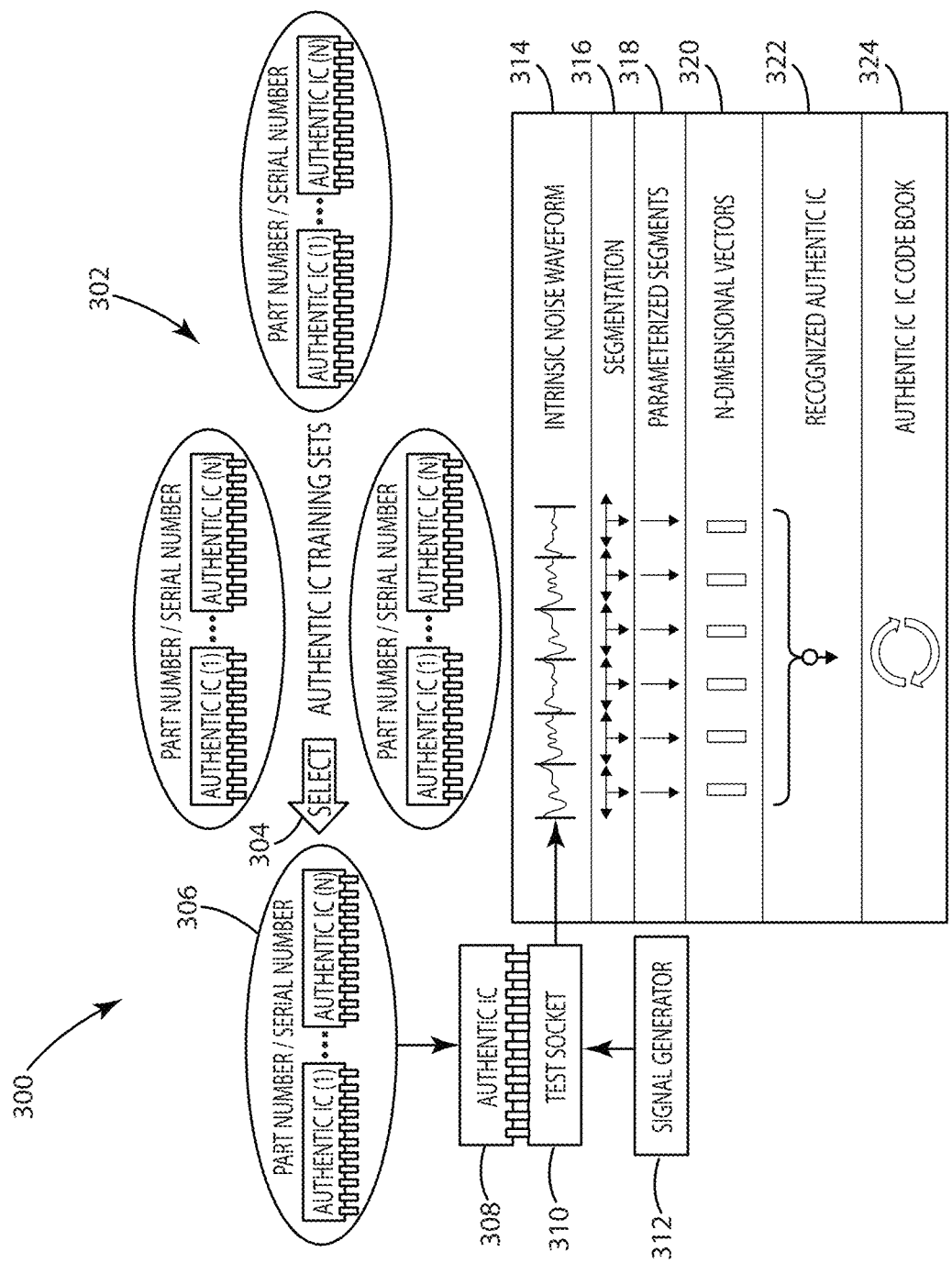
FIG. 3 illustrates a representative diagram of an enrollment process for an electronic component classification system.

FIG. 3 illustrates one embodiment of a method of training a classification or electronic component authentication system 300. The method includes receiving a plurality of authentic IC training sets that can be used to build an authentic integrated circuit codebook or classifier 302. The method includes selecting 304 one of the authentic integrated circuit training sets 306 and installing each integrated circuit in the set, one at a time, 308 into a test socket 310 or component interface of a classification system. A signal generator 312 can apply a signal, such as an external clock signal, to the authentic integrated circuit and measure an intrinsic property of the integrated circuit, such as a current draw signal that is representative of an intrinsic noise waveform 314. That waveform can be segmented 316 and parameterized 318 into an n-dimensional vector 320. That vector can then be stored as a recognized authentic IC 322 in an authentic IC codebook or classifier 324.

Figure 4:
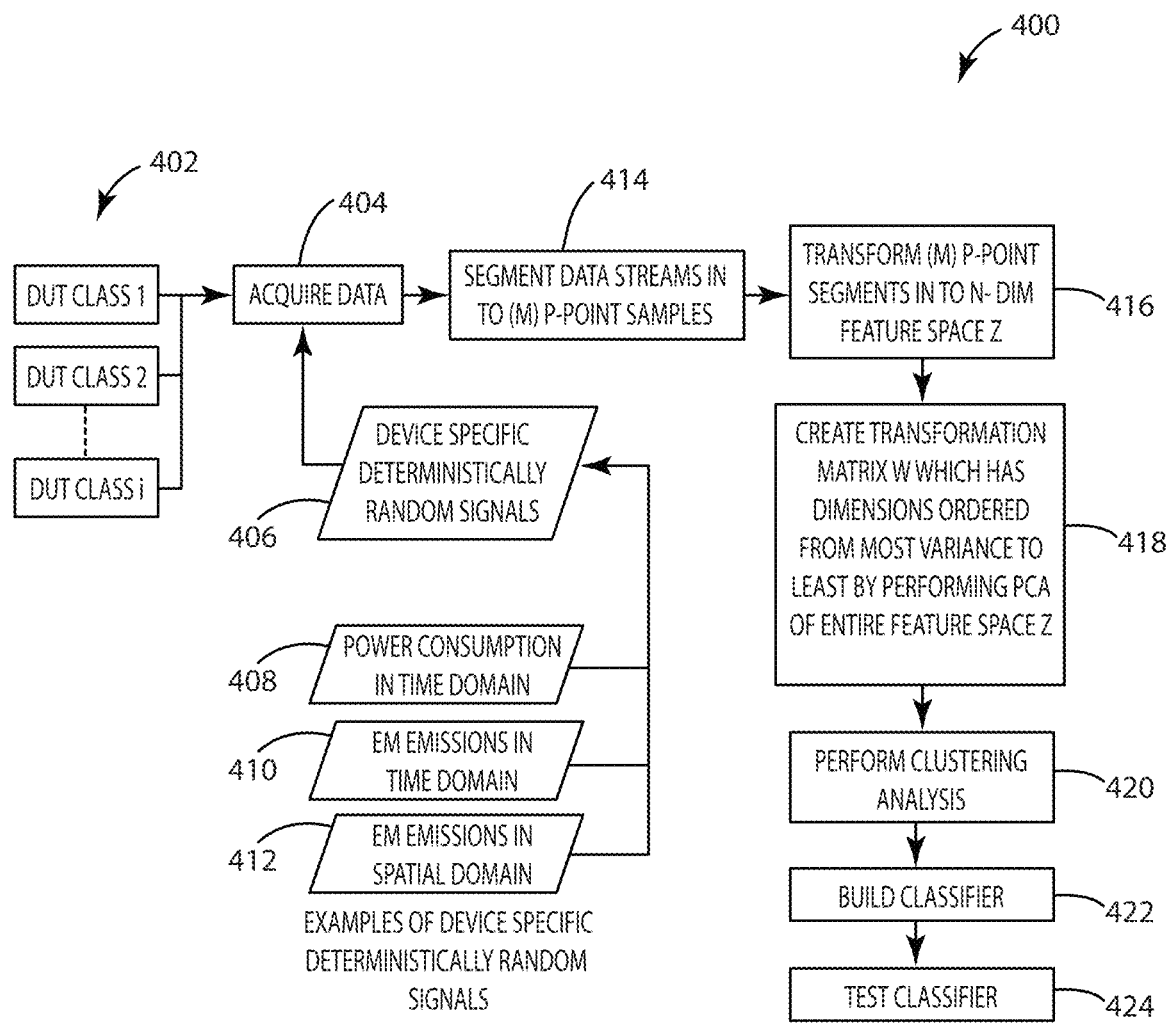
FIG. 4 illustrates a flowchart for enrollment for an electronic component classification system.

FIG. 4 illustrates one embodiment of a method of building a classifier 400. The method includes acquiring data 404 from multiple components under test (DUT) from different classes 402. The data acquired can be a variety of component specific deterministically random signals 406 such as power consumption in the time domain 408, EM emission in the time domain 410, or EM emissions in the spatial domain 412. When obtained under idle conditions, these signals are indicative of the intrinsic noise signal inside the component, which is a unique signal that can act as a fingerprint for that component, or as a unique class signal for that component class.

The data collected can be segmented into separate data streams in m, p-point samples 414. Each of the m, p-point segments can be transformed into n-dimensional feature space Z 416. A transformation matrix, w, can be created that has p dimensions ordered from most variance to least 418. In one embodiment, this transformation matrix is created by conducting a principal component analysis of the entire feature space Z. This transformation matrix can be used to perform the clustering analysis 420 and build the classifier 422. The classifier may be tested by conducting a test with known authentic and known counterfeit components to ensure the classifier provides the appropriate output 424.

In one embodiment, each deterministically random signal is about 500 dimensions, taken from 500 point segments of the original signal. After PCA the 500 dimension vectors can be reduced to about 20 dimensions. The cosine distance between these vectors can be used to compare them. In alternative embodiments, a different distance calculation may be used to compare the vectors.

Figure 17:
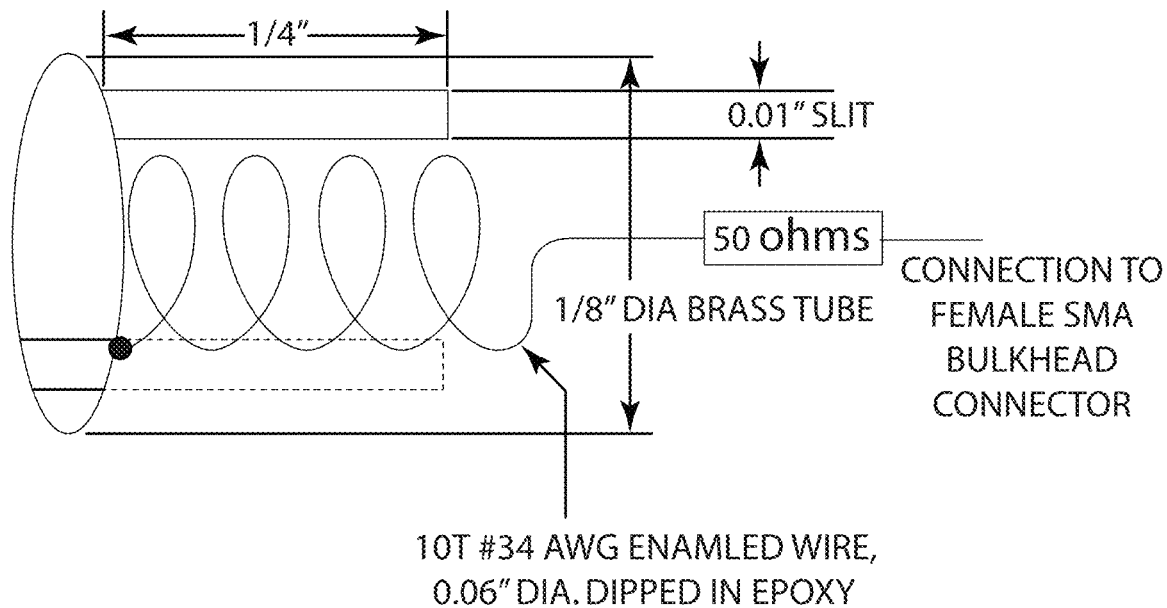
FIG. 17 illustrates an exemplary diagram of a magnetic field sensor.
Figure 18:
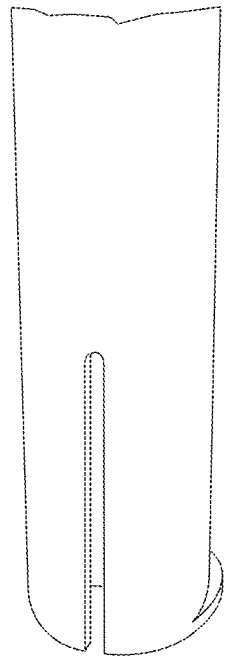
FIG. 18 illustrates a photograph of an exemplary magnetic field sensor.

Different types of sensors can be used to measure the different signals. FIG. 17 illustrates a block diagram of one embodiment of a magnetic field sensor. The sensor includes a faraday shield having two slits toward one end for reducing eddy currents, a coiled wire connected to a bulkhead. In the depicted embodiment, the faraday shield is a brass tube and has a ⅛ inch diameter and the slit has a 0.01 inch width and ¼ inch length. The coil is made from a 10T #34 AWG enameled wire, 0.06 inch diameter dipped in epoxy and has a 50 ohm impedance. FIG. 18 illustrates a perspective view of the magnetic sensor. Different values or materials may be used in construction of a magnetic field sensor for alternative embodiments. Further, different types of magnetic field sensors may be used in alternative embodiments.

Figure 19:
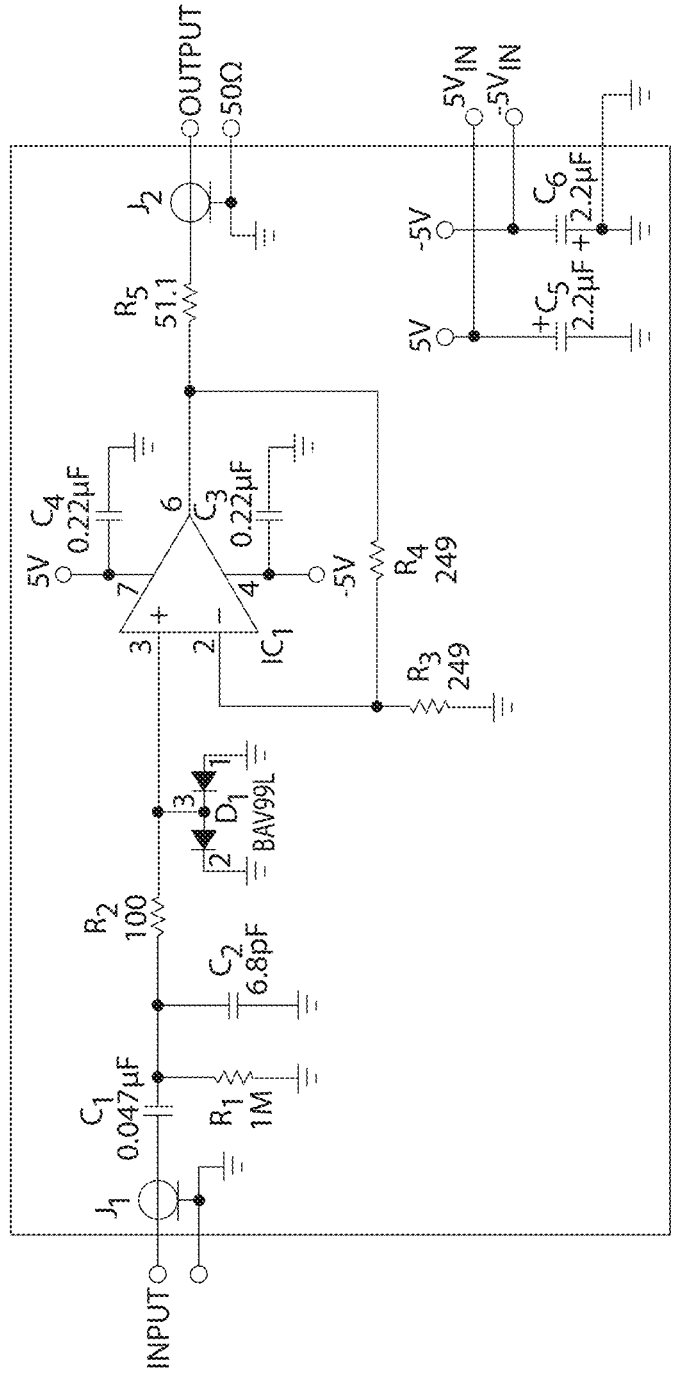
FIG. 19 illustrates an exemplary circuit diagram of an electric field sensor.
Figure 20:
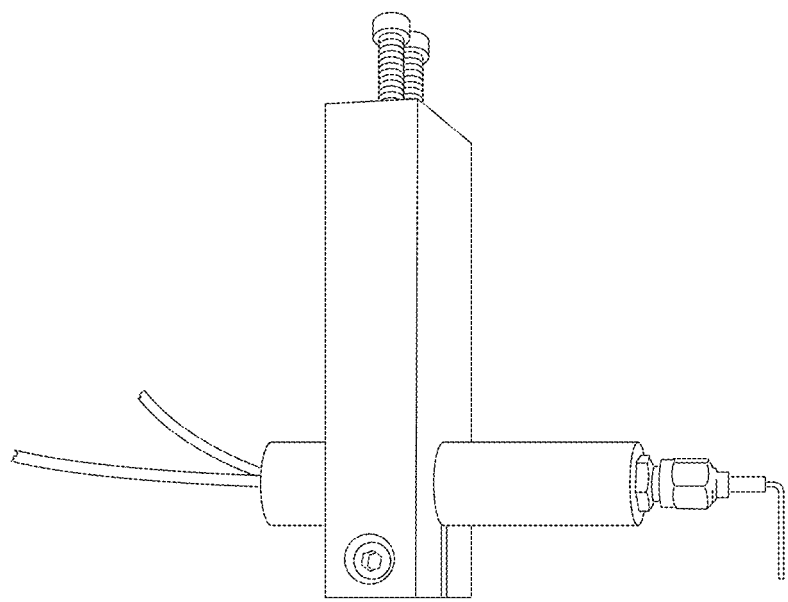
FIG. 20 illustrates a photograph of an exemplary electric field sensor.

FIG. 19 illustrates one embodiment of an electric field sensor. The depicted electric field sensor is a field effect transistor active e-field probe amplifier. In one embodiment, a short rod electric field probe is connected to a high speed FET input operational amplifier, or other broadband high impedance buffer to achieve lock with the system clock of the device under test as well as pick up data for classification. The sensor amplifier may be enclosed for shielding stray pickup. The electric sensor includes a high gain amplifier at a frequency of interest. In the current embodiment, the frequency of interest is in the 100 k-90 Mhz frequency band. FIG. 20 illustrates a perspective view of the FET active e-field probe amplifier.

Figure 21:
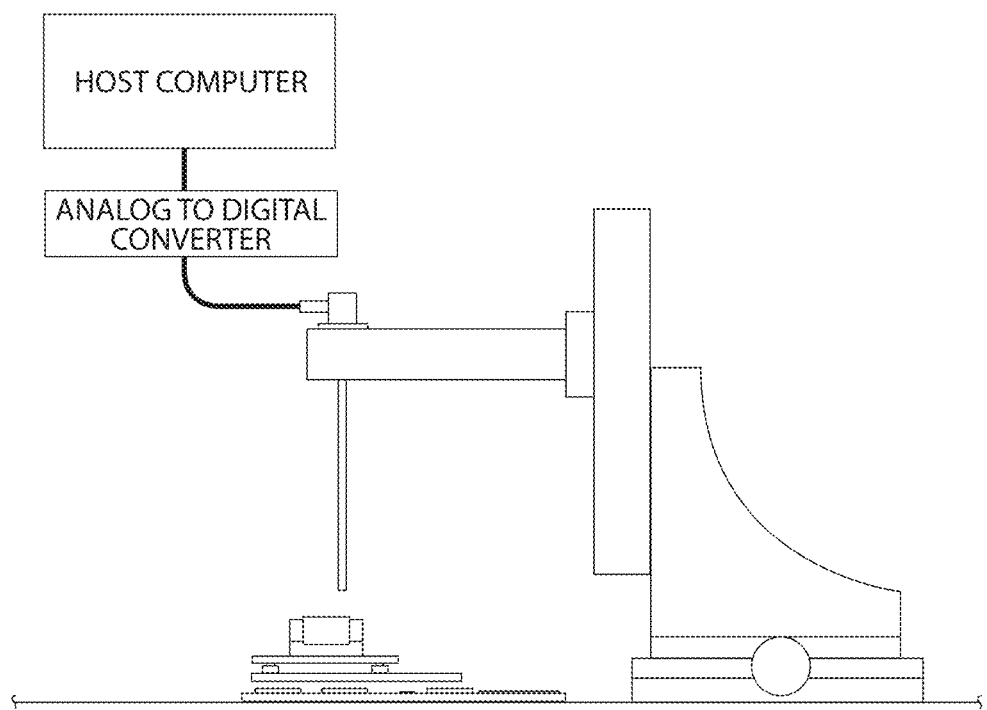
FIG. 21 illustrates a photograph of an exemplary stationary stand for a sensor.
Figure 22:
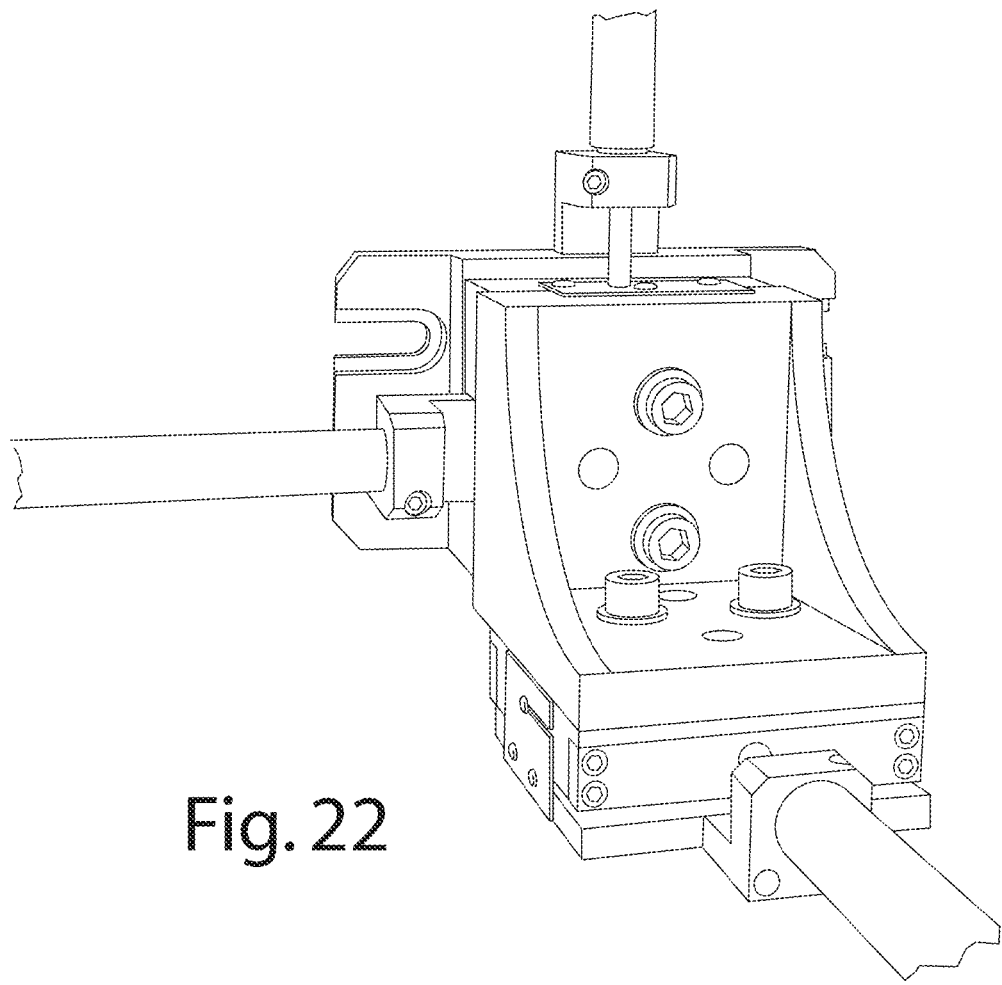
FIG. 22 illustrates a photograph of an exemplary x-y table for a sensor.

The magnetic and electric field sensors can be used to measure magnetic/electric fields in time and/or space. FIG. 21 illustrates a sensor stand for positioning the sensor in a fixed position near the subject electronic component. In the depicted embodiment, the sensor is connected through an A/D unit to a host computer. FIG. 22 illustrates an x-y sensor stand for systematically varying the position of the sensor in order to obtain spatial magnetic or electric field readings. In one embodiment, the x-y stand can be used to dynamically adjust the position of the electric and/or magnetic sensor until a peak electric or magnetic sensor value is reached. This may help to overcome minor differences of epoxy in the packaging.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method of classifying an unknown electronic component comprising:
    measuring with a sensor system, a noise signal for each of a plurality of electronic components;
    building a classifier for a classification system based on the noise signals of the plurality of electronic components by segmenting each noise signal into a noise vector, transforming each noise vector into a feature vector, conducting a statistical analysis on each feature vector, and clustering the feature vectors to create the classifier;
    measuring, with the sensor system a noise signal of the unknown electronic component;
    classifying the unknown electronic component using the classifier and the noise signal of the unknown electronic component; and
    wherein the classification system classifies the unknown electronic component according to functionality and performance characteristics.

2. The method of claim 1 wherein the classification system classifies the unknown electronic component according to thermal performance characteristics.

3. The method of claim 1 wherein the classification system classifies the unknown electronic component according to manufacturing date.

4. The method of claim 1 wherein the classification system classifies the unknown electronic component according to manufacturing equipment.

5. The method of claim 1 wherein the classification system classifies the unknown electronic component according to version, wherein the plurality of electronic components include different related versions that i) share functionality; and ii) have different combinations of subcomponents.

6. The method of claim 1 wherein the plurality of electronic components are temporarily installed one at a time into a component interface.

7. A method of classifying a plurality of unknown electronic components comprising:
    measuring with a sensor system, a noise signal for each of the plurality of electronic components;
    building a classifier for a classification system based on the noise signals of the plurality of electronic components by segmenting each noise signal into a noise vector, transforming each noise vector into a feature vector, conducting a statistical analysis on each feature vector, and clustering the feature vectors to create the classifier;
    measuring with a sensor system, a noise signal for each of the plurality of unknown electronic components;
    classifying the plurality of unknown electronic components based on the measured noise signals with the classifier; and
    wherein the classification system differentiates the plurality of unknown electronic components between electronic components that have shared functionality but different performance characteristics.

8. The method of claim 7 wherein the classification system differentiates the plurality of unknown electronic components between electronic components that have different thermal performance characteristics.

9. The method of claim 8 wherein the plurality of electronic components are temporarily installed one at a time into a component interface of the electronic component authentication system and wherein the plurality of unknown electronic components are temporarily installed one at a time into the component interface of the electronic component authentication system.

10. The method of claim 8 wherein the classification system differentiates the plurality of unknown electronic components between electronic components that have identical functionality but different performance characteristics.

11. The method of claim 7 wherein the classification system differentiates the plurality of unknown electronic components between electronic components that have different manufacturing dates.

12. The method of claim 7 wherein the classification system differentiates the plurality of unknown electronic components between electronic components manufactured by different equipment.

13. The method of claim 7 wherein the classification system differentiates the plurality of unknown electronic components between different related versions of electronic components, wherein the plurality of electronic components include different related versions that i) share functionality; and ii) have different combinations of subcomponents.

14. The method of claim 7 wherein the classification system differentiates the plurality of unknown electronic components between electronic components that have different functionality.

15. A method of classifying an unknown electronic component comprising:
    measuring, with a sensor system, a noise signal for each of a plurality of known electronic components;
    building a classifier for a classification system based on the noise signals of the plurality of known electronic components by segmenting each noise signal into a noise vector, transforming each noise vector into a feature vector, conducting a statistical analysis on each feature vector, and clustering the feature vectors to create the classifier, wherein the classifier differentiates between electronic components that share functionality but have different performance characteristics;
    measuring, with the sensor system, a noise signal of the unknown electronic component; and
    classifying the unknown electronic component using the classification system and the noise signal of the unknown electronic component.

16. The method of claim 15 wherein the classification system classifies the unknown electronic component according to thermal performance characteristics.

17. The method of claim 15 wherein the classification system classifies the unknown electronic component according to manufacturing date.

18. The method of claim 15 wherein the classification system classifies the unknown electronic component according to manufacturing equipment.

19. The method of claim 15 wherein the classification system classifies the unknown electronic component according to version, wherein the plurality of known electronic components include different related versions that i) share functionality; and ii) have different combinations of sub-components.

20. The method of claim 15 wherein the plurality of known electronic components are temporarily installed one at a time into a component interface.

\* \* \* \* \*